United States Patent
Lee et al.

(10) Patent No.: US 11,544,102 B2
(45) Date of Patent: Jan. 3, 2023

(54) APPARATUS AND METHOD FOR BATCH PROCESSING FOR BLOCKCHAIN TRANSACTIONS

(71) Applicant: SAMSUNG SDS CO., LTD., Seoul (KR)

(72) Inventors: Kyu Sang Lee, Seoul (KR); Chang Suk Yoon, Seoul (KR); Sang Jun Kang, Seoul (KR); Ki Woon Sung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 549 days.

(21) Appl. No.: 16/660,998

(22) Filed: Oct. 23, 2019

(65) Prior Publication Data

US 2020/0125391 A1  Apr. 23, 2020

(30) Foreign Application Priority Data

Oct. 23, 2018  (KR) ........................ 10-2018-0126899

(51) Int. Cl.
*G06F 9/46* (2006.01)
*G06F 16/23* (2019.01)

(52) U.S. Cl.
CPC .......... *G06F 9/466* (2013.01); *G06F 16/2379* (2019.01)

(58) Field of Classification Search
USPC ............................................................ 718/1
See application file for complete search history.

(56) References Cited

U.S. PATENT DOCUMENTS

| 10,102,265 | B1 | 10/2018 | Madisetti et al. | |
| 2017/0068566 | A1* | 3/2017 | Hosie | G06F 9/4881 |
| 2017/0295232 | A1* | 10/2017 | Curtis | G06F 16/27 |
| 2018/0329945 | A1* | 11/2018 | Horii | G06F 9/528 |
| 2019/0199515 | A1* | 6/2019 | Carver | H04L 9/0643 |
| 2019/0356471 | A1* | 11/2019 | Vaughn | G06F 21/64 |
| 2021/0256016 | A1* | 8/2021 | Gramoli | H04L 9/3239 |

FOREIGN PATENT DOCUMENTS

| KR | 10-2018-0014534 A | 2/2018 |
| KR | 10-2019-0128826 A | 11/2019 |

OTHER PUBLICATIONS

Baliga et al., "Performance Characterization of Hyperledger Fabric", Jun. 1, 20018, IEEE, pp. 65-74. (Year: 2018).*
European Search Report For EP19204796.7 dated Feb. 19, 2020 from European patent office in a counterpart European patent application.
Notice of Allowance dated Jul. 4, 2022 from Korean Patent Office in a counterpart Korean Patent Application No. 10-2018-0126899 (all the cited references are listed in this IDS.) (English translation is also submitted herewith.

* cited by examiner

*Primary Examiner* — Kenneth Tang
(74) *Attorney, Agent, or Firm* — The PL Law Group, PLLC

(57) ABSTRACT

A method for batch processing for a plurality of individual transactions includes generating a batch transaction by aggregating at least some of the plurality of individual transactions according to a setting value of a batch size, and processing the batch transaction via a blockchain network. The generation of the batch transaction includes adjusting the setting value of the batch size based on a monitoring result for a transaction processing status, and generating the batch transaction according to the adjusted setting value.

18 Claims, 16 Drawing Sheets

100

APPARATUS AND METHOD FOR BATCH PROCESSING FOR BLOCKCHAIN TRANSACTIONS

CROSS-REFERENCE TO RELATED APPLICATION

This application claims priority from Korean Patent Application No. 10-2018-0126899 filed on Oct. 23, 2018, in the Korean Intellectual Property Office, and all the benefits accruing therefrom under 35 U.S.C. 119, the contents of which in their entirety are herein incorporated by reference.

BACKGROUND

1. Technical Field

The present invention relates to an apparatus and a method for performing batch processing on a blockchain transaction. More particularly, the present invention relates to an apparatus for performing batch processing on a plurality of blockchain transactions and a method performed in the apparatus to improve transaction processing performance of a blockchain-based system.

2. Description of the Related Art

Blockchain is a data management technology that records continuously increasing data in a specific unit of block, and each blockchain node constituting a peer-to-peer (P2P) network manages the block as a chain-type data structure. The blockchain ensures the integrity and security of transactions through a consensus process where every blockchain node in the network records and verifies every transaction.

However, the consensus process of the blockchain is also a major factor that degrades the transaction processing performance of the blockchain-based system because the processing power of the blockchain-based system is limited to that of a single node. In other words, in the blockchain-based system, even if the number of blockchain nodes is increased, the processing performance of the system cannot be improved, and the processing efficiency of a single blockchain node cannot be exceeded. Therefore, it is very difficult to apply blockchain technology to an environment that requires rapid processing of a large amount of transactions. Accordingly, various researches on improving the performance of blockchain-based systems have been conducted.

The transaction processing performance of most blockchain-based systems (e.g. Bitcoin, Ethereum) proposed so far is known to not significantly exceed 1K TPS (transaction per sec). For example, the processing performance of Bitcoin and Ethereum, which are a kind of public blockchain, is known to be less than 100 TPS, and the processing performance of Hyperledger Fabric, which is a kind of private blockchain, is also known to not significantly exceed 1K TPS. This is a very low performance compared to a normal database. Therefore, although many industries are considering the introduction of blockchain-based systems, it is practically difficult to replace legacy systems with the blockchain-based systems.

In conclusion, in order to advance the practical use of blockchain technology and expand the scope of application, it is urgently needed to solve performance issues of the blockchain-based systems

SUMMARY

Aspects of the present invention provide an apparatus for batch processing and a method performed on the apparatus that may improve the transaction processing performance of blockchain-based systems through batch processing.

Aspects of the present invention also provide an apparatus for batch processing and a method performed on the apparatus that may minimize the delay of transaction processing, the risk of processing failure, or the like due to batch processing by adjusting a setting value of batch size depending on the transaction processing status.

However, aspects of the present invention are not restricted to those set forth herein. The above and other aspects of the present invention will become more apparent to one of ordinary skill in the art to which the present invention pertains by referencing the detailed description of the present invention given below.

According to the present disclosure, an apparatus for batch processing for a plurality of individual transactions is provided. The apparatus comprises, a memory for storing one or more instructions, a communication interface for communicating with a blockchain network, and a processor, the processor executing the one or more instructions for batch processing function to generate a batch transaction by aggregating at least some of the plurality of individual transactions depending on a setting value of a batch size and to process the batch transaction via the blockchain network. The processor may adjust the setting value of the batch size based on a monitoring result for a transaction processing status.

According to the present disclosure, a method for batch processing for a plurality of individual transactions in an apparatus for batch processing is provided. The method comprises generating a batch transaction by aggregating at least some of the plurality of individual transactions according to a setting value of a batch size, processing the batch transaction via a blockchain network. The generating the batch transaction comprises adjusting the setting value of the batch size based on a monitoring result for a transaction processing status and generating the batch transaction according to the adjusted setting value.

According to the present disclosure, a computer program product stored on a computer readable recording medium is provided. The computer program product causing to generate a batch transaction by aggregating at least some of a plurality of individual transactions according to a setting value of a batch size and process the batch transaction via a blockchain network. The generating the batch transaction may comprise, adjusting the setting value of the batch size based on a monitoring result for a transaction processing status, and generating the batch transaction according to the adjusted setting value.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
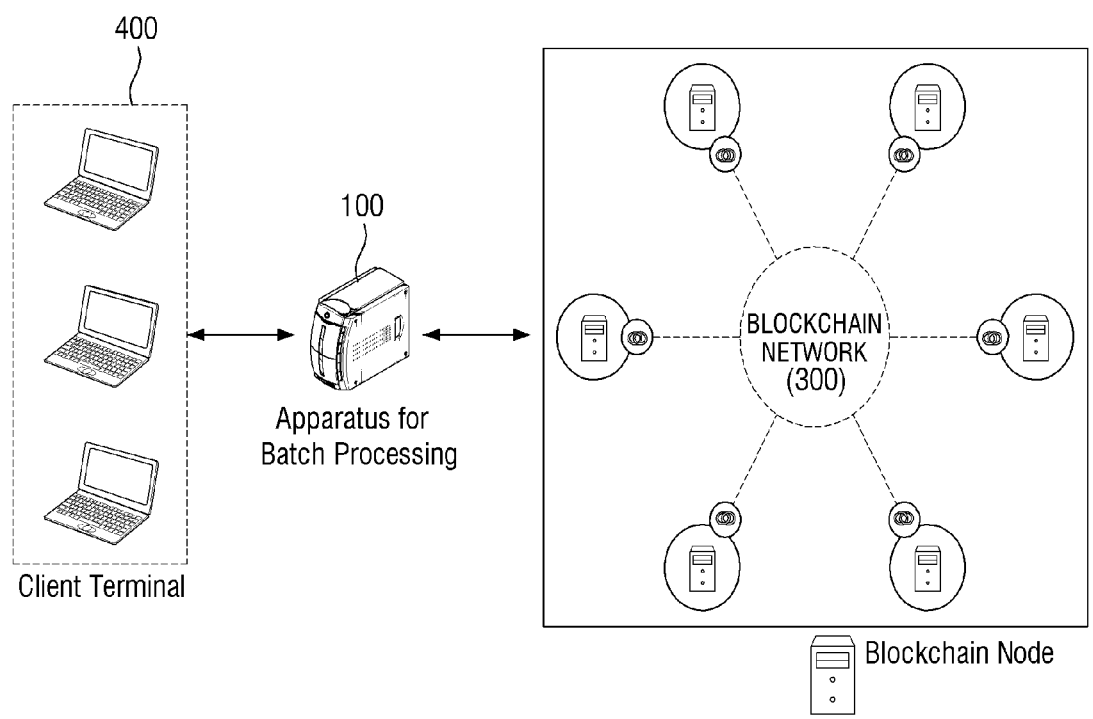
FIG. 1 is a block diagram of a system for processing a blockchain-based transaction according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Prior to the description of the present invention, some of the terms used herein will be clarified.

Herein, a blockchain or blockchain data is data maintained by each blockchain node constituting a blockchain network and refers to data in which at least one block is composed of a chain-type data structure. In a blockchain-based system, all blockchain nodes maintain the same blockchain data. However, in a blockchain-based system (e.g. Hyperledger Fabric) supporting multi-channel functions, only blockchain nodes belonging to the same channel maintain the same blockchain data.

Herein, a blockchain network refers to a network having a peer-to-peer (P2P) structure composed of a plurality of blockchain nodes operating according to a blockchain algorithm (or protocol).

Herein, a blockchain node refers to a computing node constituting a blockchain network and operating according to a blockchain algorithm (or protocol). The computing node may be implemented as a physical apparatus but may also be implemented as a logical apparatus such as a virtual machine. When the computing node is implemented as a virtual machine, a plurality of blockchain nodes may be included in one physical apparatus.

Herein, a transaction or blockchain transaction may mean all actions that cause a change in state in the blockchain environment (e.g. change in balance, asset transfer), all actions to inquire state data recorded in the blockchain, or data indicating the actions. For example, the transaction may include an action to write specific data on the blockchain, an action to read specific data recorded on the blockchain, or the like. The transaction may be classified into a write type transaction (e.g. a transaction such as adding, modifying, or deleting the state data) and a read type transaction (e.g. a transaction inquiring the state data). Naturally, depending on a blockchain platform, there may be various types of transactions (e.g. execution) in addition to the read and write types, and in such a case, the transaction may include all the various types of transactions. In addition, in the art, it may be used interchangeably with terms such as a query of the read type transaction. The transaction may be executed through a smart contract (e.g. it may be accessed to the blockchain through functions and variables defined in the smart contract), but it may vary depending on implementations.

Herein, the smart contract means a script or software code used for transaction processing in the blockchain-based system. More specifically, the smart contract is a code that programmatically writes various conditions, states, and behaviors depending on the conditions used for the transaction processing, and for example, it may include a smart contract of Ethereum, a chain code of Hyperledger Fabric, or the like. In the blockchain-based system, the blockchain node may share the smart contract through the blockchain.

Herein, an instruction is a series of instructions grouped by function and refers to a component of a computer program and is executed by a processor.

Hereinafter, some embodiments of the present invention will be described in detail with reference to the accompanying drawings.

FIG. 1 is a block diagram of a system for processing a blockchain-based transaction according to an embodiment of the present invention.

Referring to FIG. 1, the transaction processing system may include an apparatus for batch processing 100 and a plurality of blockchain nodes 200 constituting a blockchain network 300. However, this is only a preferred embodiment for achieving the object of the present invention. Naturally, some components may be added or deleted as necessary. In addition, it is noted that each apparatus illustrated in FIG. 1 represents functionally distinct functional elements, and at least one apparatus may be implemented to be integrated with each other in an actual physical environment. For example, the apparatus for batch processing 100, a client terminal 400, and/or the blockchain node 200 may be implemented in the form of different logic within the same physical computing apparatus. In other words, the apparatus for batch processing 100 may operate as the blockchain node 200, and a batch processing function may be implemented at the client terminal 400 side.

In the transaction processing system, the apparatus for batch processing 100 is a computing apparatus that generates a batch transaction by aggregating a plurality of transactions requested from the client terminal 400 and provides batch processing service for the batch transaction in cooperation with the blockchain network 300. Here, the computing apparatus may be a notebook, a desktop, a laptop, or the like, but is not limited thereto. It may include any kinds of apparatus equipped with an operation means and a communication means. However, in an environment in which a large amount of transaction processing is required, preferably, the apparatus for batch processing 100 may be implemented as a high-performance server-class computing apparatus.

The apparatus for batch processing 100 may operate as a kind of proxy to process a plurality of transactions requested from a plurality of client terminals 400. Specifically, the apparatus for batch processing 100 may generate a batch transaction by aggregating the plurality of transactions obtained from the client terminal 400, perform a process for the batch transaction in cooperation with the blockchain network 300, and provide a processing result of the transaction to each client terminal 400. A detailed description of the configuration and operation of the apparatus for batch processing 100 will be described in detail with reference to FIG. 4 and the subsequent drawings.

According to some embodiments of the present invention, a plurality of apparatus for batch processing (e.g. 100a and 100b of FIG. 3) may be arranged in the transaction processing system. By doing so, the performance, stability, or availability of the transaction processing system may be further improved. Here, the cooperated relationship between the apparatus for batch processing 100 and the blockchain node 200 may be configured in various forms as in the following embodiments.

Figure 2:
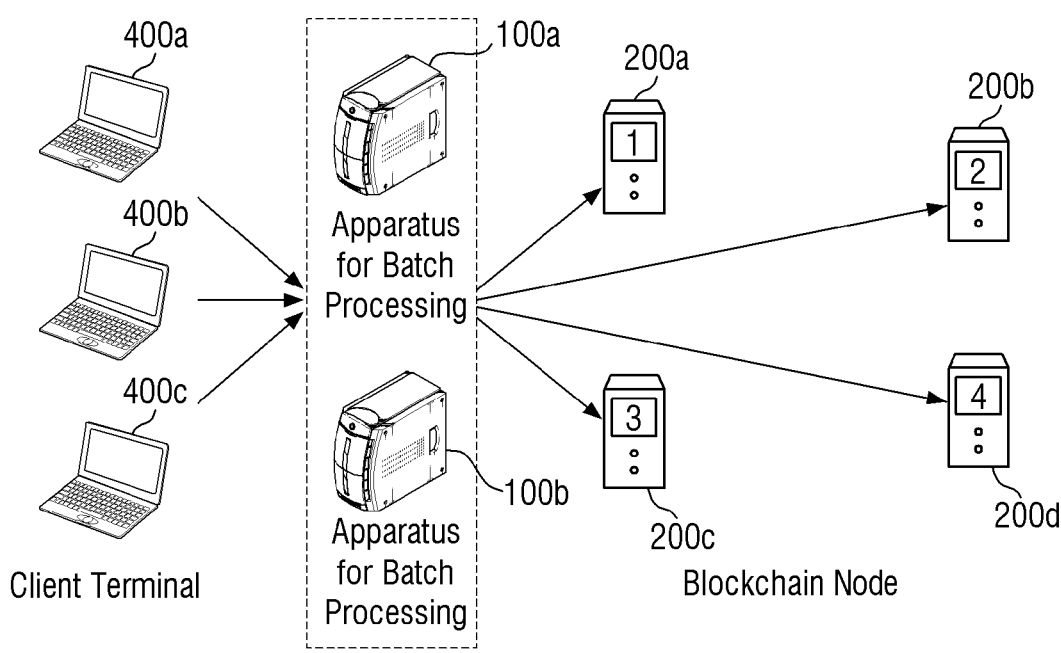
FIGS. 2 and 3 are diagrams for describing the cooperated relationship between an apparatus for batch processing and a blockchain node according to some embodiments of the present invention.

In a first embodiment, as shown in FIG. 2, each of the plurality of apparatus for batch processing 100a and 100b is cooperated with all blockchain nodes 200a to 200d, and transactions requested by the client terminals 400a to 400c may be distributed and processed through the plurality of apparatus for batch processing 100a and 100b. In the embodiment, the transactions requested by the client terminals 400a to 400c are distributed to either of the apparatus for batch processing 100a or 100b, and the apparatuses for batch processing 100a or 100b process the transaction in cooperation with the entire blockchain nodes 200a to 200d.

Figure 3:
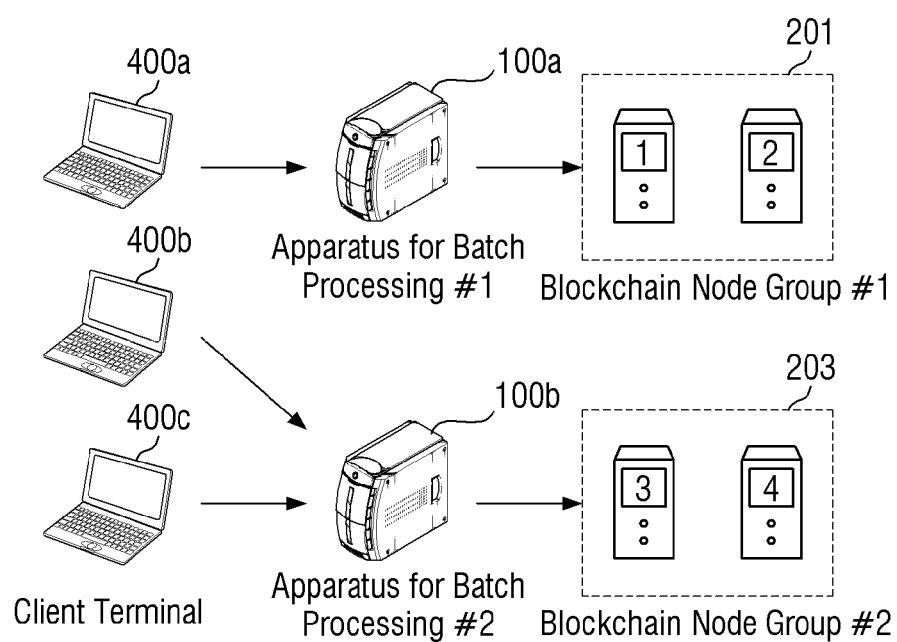

In a second embodiment, as shown in FIG. 3, each of the plurality of apparatus for batch processing 100a and 100b may be in conjunction with some blockchain nodes 201 or 203. For example, a first apparatus for batch processing 100a may be cooperated with the first blockchain node group 201, and a second apparatus for batch processing 100b may be in conjunction with a second blockchain node group 203. In the embodiment, the apparatus for batch processing 100a and 100b process the requested transaction in cooperation with its own dedicated blockchain node group 201 and 203.

In the second embodiment as described above, the first blockchain node group 201 may correspond to a first channel of the blockchain network 300, and the second blockchain node group 203 may correspond to a second channel of the blockchain network 300. In other words, a dedicated apparatus for batch processing (e.g. 100a and 100b) may be allocated to each channel of the blockchain network 300. Naturally, depending on embodiments, a dedicated apparatus for batch processing 100 may be allocated to each blockchain node 200.

In the first or second embodiment as described above, certain apparatuses (not shown) may provide a list of apparatus for batch processing (e.g. 100a and 100b) to the client terminal 400. Here, the apparatus (not shown) may provide load information of each apparatus for batch processing (e.g. 100a and 100b) together. Here, the load information may include load information (e.g. CPU utilization) of the apparatus for batch processing 100a and 100b and load information of the blockchain nodes (e.g. 201, 203) cooperated with each apparatus for batch processing 100a and 100b. In the embodiment, the client terminal 400 may select a specific apparatus for batch processing (e.g. 100a, 100b) based on the list of the apparatus for batch processing and the load information, and the requested transaction may be processed through the selected apparatus for batch processing (e.g. 100a, 100b). A function of the apparatus (not shown) may be provided in the apparatus for batch processing (e.g. 100a, 100b), but the scope of the present invention is not limited thereto.

According to an embodiment of the present invention, the apparatus for batch processing 100 may adjust a setting value of a batch size based on a monitoring result for a transaction processing status. Here, the batch size is a parameter that regulates the number of individual transactions included in the batch transaction. In addition, monitoring indicators related to the transaction processing status may include, for example, the number of incoming transactions, the number of outgoing transactions, a time required for processing a transaction, a load of the apparatus for batch processing 100 or the blockchain network 300, whether a transaction processing failure event occurs, a waiting time of a transaction, etc. However, the technical scope of the present invention is not limited thereto. According to the embodiment, by adjusting the setting value of the batch size depending on a status, adverse effects due to the batch processing (e.g. increased risk due to a transaction processing failure and a processing delay due to the batch processing) may be minimized. A detailed description of the embodiment will be described in detail with reference to FIG. 12 and the subsequent drawings.

In the transaction processing system, the blockchain node 200 constitutes the blockchain network 300 having the P2P structure, and is a node operating according to a blockchain protocol. The blockchain node 200 may share various smart contracts and transaction data through the blockchain and may guarantee the integrity and security of the transaction through the consensus process.

The blockchain node 200 may perform a batch consensus process for the batch transactions. Specifically, the blockchain node 200 may perform a series of consensus processes including executing the smart contract for each transaction included in the batch transaction, signing an execution result of the smart contract, recording the signature and the execution result in a block and propagating it, or the like. The specific process of the consensus process may vary depending on how the blockchain-based system is implemented.

According to an embodiment of the present invention, the blockchain node 200 may divide the execution results of the batch transaction into individual transactions (or status data) through smart contract-based processing and use the divided execution results to update the blockchain nodes. A more detailed description of the operation of the blockchain node 200 will be described later with reference to FIGS. 5 to 7.

Meanwhile, according to some embodiments of the present invention, the plurality of blockchain nodes 200 may be configured of a plurality of types of blockchain nodes that at least partially perform different operations. For example, a first type of blockchain node (e.g., an "endorsing peer" of Hyperledger Fabric) may execute the smart contract and sign on the execution result. In addition, a second type of blockchain node (e.g. an "orderer" of Hyperledger Fabric) may perform a main consensus process on the execution result of the smart contract or perform an operation of recording the execution result in a block and propagating it.

Hereinafter, the first type of blockchain node and the second type of blockchain node will continue to be used as above. Further, in order to distinguish the second type of blockchain node from the first type of blockchain node, it will be referred to as a "consensus node."

In the transaction processing system, the client terminal 400 is a terminal that receives a processing service for a transaction. The client terminal 400 may generate a transaction, send the generated transaction to the apparatus for batch processing 100 and/or the blockchain network 300, and be provided with a processing result for the transaction from the apparatus for batch processing 100 and/or the blockchain network 300.

The client terminal 400, the apparatus for batch processing 100, and the blockchain node 200 may communicate via a network. Here, the network may be implemented as any type of wired/wireless network such as a local area network (LAN), a wide area network (WAN), a mobile radio communication network, a wireless broadband Internet (Wibro), or the like.

The blockchain-based transaction processing system according to an embodiment of the present invention has been described with reference to FIGS. 1 to 3. Next, the configuration and operation of the apparatus for batch processing 100 according to an embodiment of the present invention will be described in detail with reference to FIGS. 4 to 8.

Figure 4:
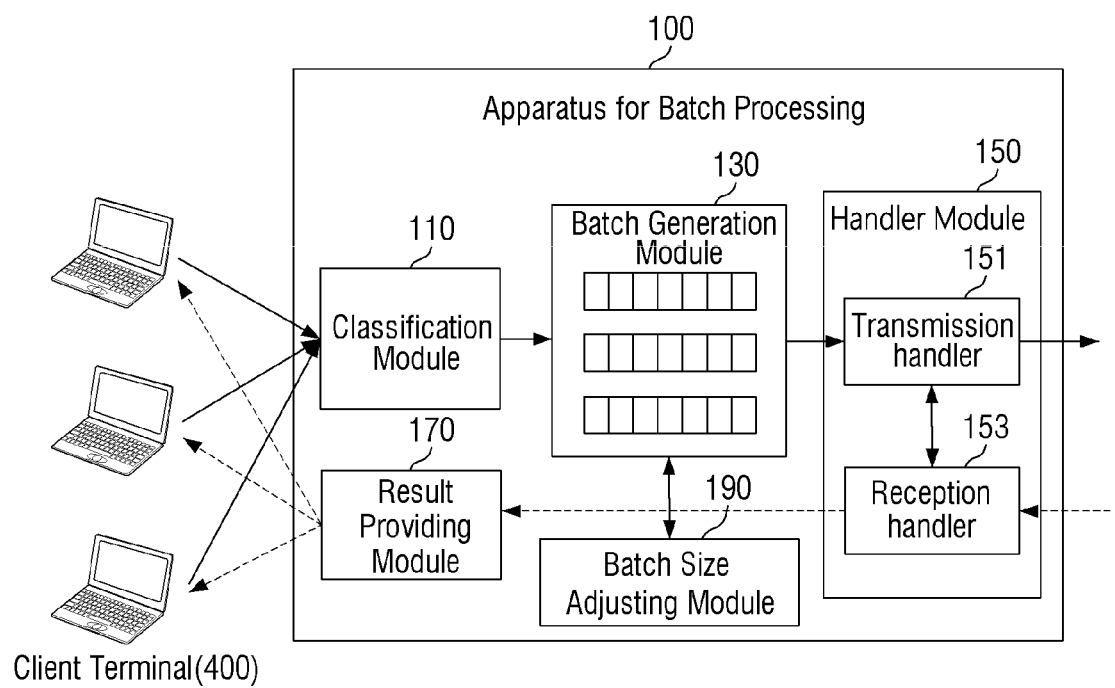
FIG. 4 is a block diagram illustrating an apparatus for batch processing according to an embodiment of the present invention.

FIG. 4 is a block diagram illustrating an apparatus for batch processing 100 according to an embodiment of the present invention.

Referring to FIG. 4, the apparatus for batch processing 100 may include a classification module 110, a batch generation module 130, a handler module 150, a result providing module 170, and a batch size adjusting module 190. However, FIG. 4 illustrates only components related to an embodiment of the present invention. Accordingly, it will be appreciated by those skilled in the art that the present invention may further include other general-purpose components in addition to the components illustrated in FIG. 4. In addition, each component of the apparatus for batch processing 100 illustrated in FIG. 4 represents functionally divided functional elements and may be implemented in a form in which at least one component is integrated with each other in an actual physical environment.

Looking into each component, the classification module 110 classifies the transaction requested by the client terminal 400 according to predetermined classification criteria. Here, the predetermined classification criteria may include an identifier of a smart contract, a channel identifier, and/or a type of transaction, importance of a transaction, or the like, but is not limited thereto. Here, the transaction type may be variously defined as described above, but for convenience of understanding, it is assumed that it is divided into a write type and a read type. However, it should be noted that the technical scope of the present invention is not limited to a specific type of transaction.

In more detail, the classification module 110 may classify each transaction by a channel, smart contract, transaction type, and/or importance (e.g. classifying a write type transaction using the first smart contract of the first channel) and provide a classification result to the batch generation module 130.

According to an embodiment of the present invention, some transactions with high importance are not processed through the batch processing but may be processed individually. For example, assume that the classification module 110 classifies a plurality of transactions into a first group with low importance and a second group with high importance based on the importance of the transaction. Then, a first blockchain transaction belonging to the first transaction group may be processed in a batch form by the batch generation module 130. In addition, a second transaction belonging to the second transaction group may be directly transferred to the handler module 150 and processed individually. According to the present embodiment, a transaction with high importance may be processed more quickly, and a differential processing service depending on transaction importance may be provided.

Then, the batch generation module 130 generates a batch transaction by aggregating the plurality of transactions classified by the classification module 110. Specifically, the batch generation module 130 inserts each of the classified transactions into a batch queue corresponding to a classification result. For example, the batch generation module 130 may insert a first transaction classified as a first classification result into a first batch queue and insert a second transaction classified as a second classification result into a second batch queue. Further, the batch generation module 130 may generate a batch transaction by aggregating transactions included in a specific batch queue in response to determining that the specific batch queue (e.g. the first batch queue or the second batch queue) satisfies a predetermined batch generation condition.

The batch queue refers to a place for storing a transaction until a batch transaction is generated and may be understood as a kind of transaction buffer or a transaction pool. As may be seen from a name of a buffer queue, the batch queue may be implemented as a queue-based data structure, but the scope of the present invention is not limited thereto and may be implemented in various types of data structures.

According to an embodiment of the present invention, the predetermined batch generation condition may include a condition based on whether a timer expires, the batch size (in other words, the number of transactions), a data size of the entire transaction, the presence or absence of association between transactions, or the like. A detailed description of how the batch generation module 130 generates a batch transaction depending the batch generation conditions listed above will be described later with reference to FIGS. 9 through 11.

In addition, according to an embodiment of the present invention, the setting value of the batch size may be variably adjusted by the batch size adjusting module 190. In the embodiment, the batch generation module 130 may generate the batch transaction depending on the adjusted setting value. A detailed description of the embodiment will be described in detail with reference to FIG. 12 and the subsequent drawings.

In addition, according to an embodiment of the present invention, the batch generation module 130 may identify a transaction in which association exists and generate the batch transaction based on an identification result. For example, the batch generation module 130 may generate a first transaction and a second transaction having association as different batch transactions. A more detailed description of the embodiment will be described later.

Then, the handler module 150 batches an individual transaction or the batch transaction in cooperation with the blockchain network 300. The handler module 150 may include a transmission handler 151 and a receive handler 153.

The transmission handler 151 performs an overall transmission process for data such as the batch transaction. Specifically, the transmission handler 151 may transfer the generated batch transaction to the blockchain network 300 in response to the batch transaction being generated. In addition, the transmission handler 151 may further perform operations such as sending the execution result (e.g. endorsement) of the batch transaction signed by the blockchain node to the consensus node, retrying the batch transaction that has been failed to process, or the like.

The reception handler 153 performs an overall process for data received from the blockchain network 300, such as the processing result of the batch transaction. Specifically, the reception handler 153 provides the processing result to the result providing module 170 in response to receiving the processing result for the individual transaction or the batch transaction. In addition, the reception handler 153 may further perform an operation such as receiving the processing result of the signed batch transaction from the blockchain network 300 and transferring it to the transmission handler 151.

Figure 5:
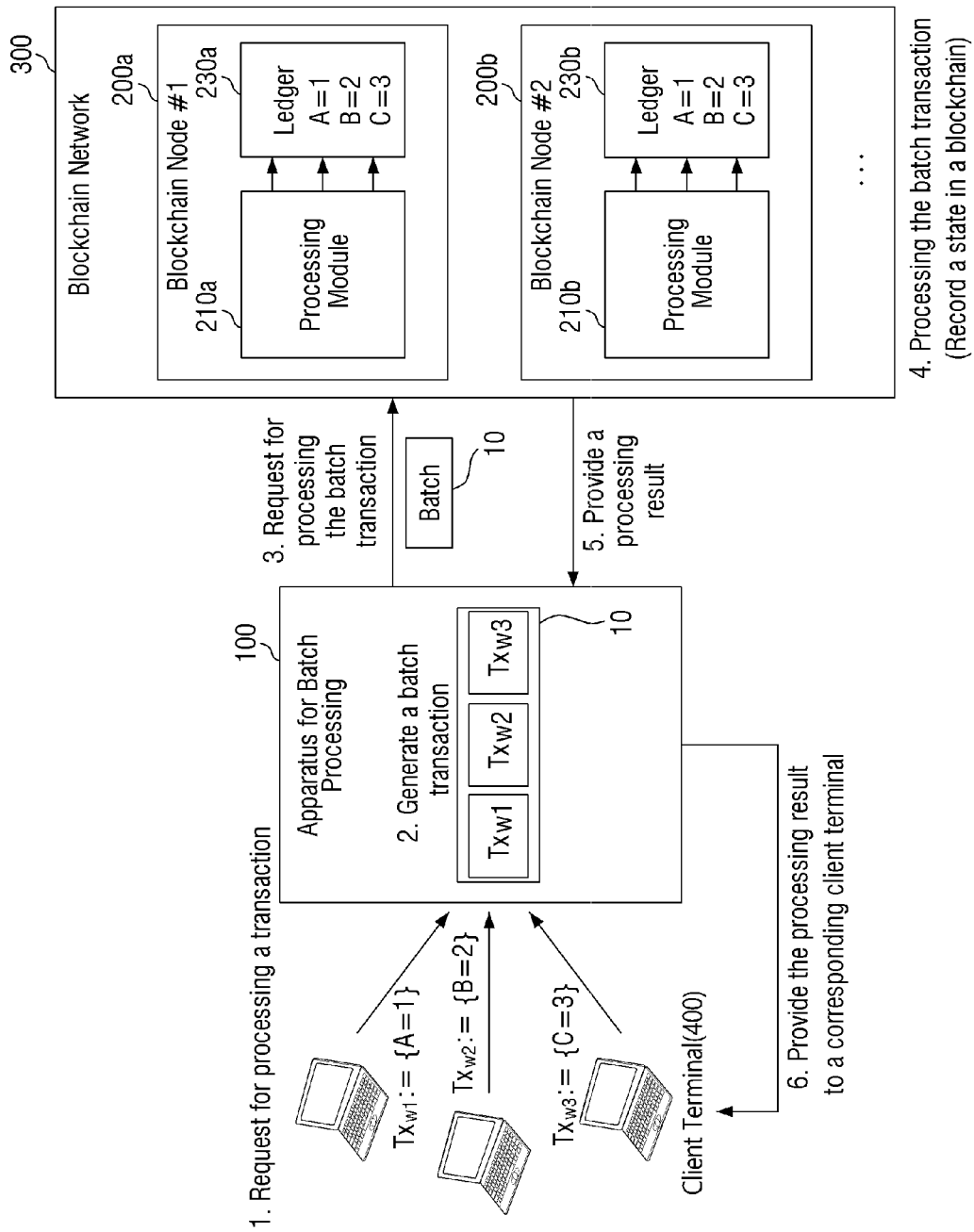
FIGS. 5 and 6 are diagrams for describing a process of processing a write type transaction according to an embodiment of the present invention.
Figure 6:
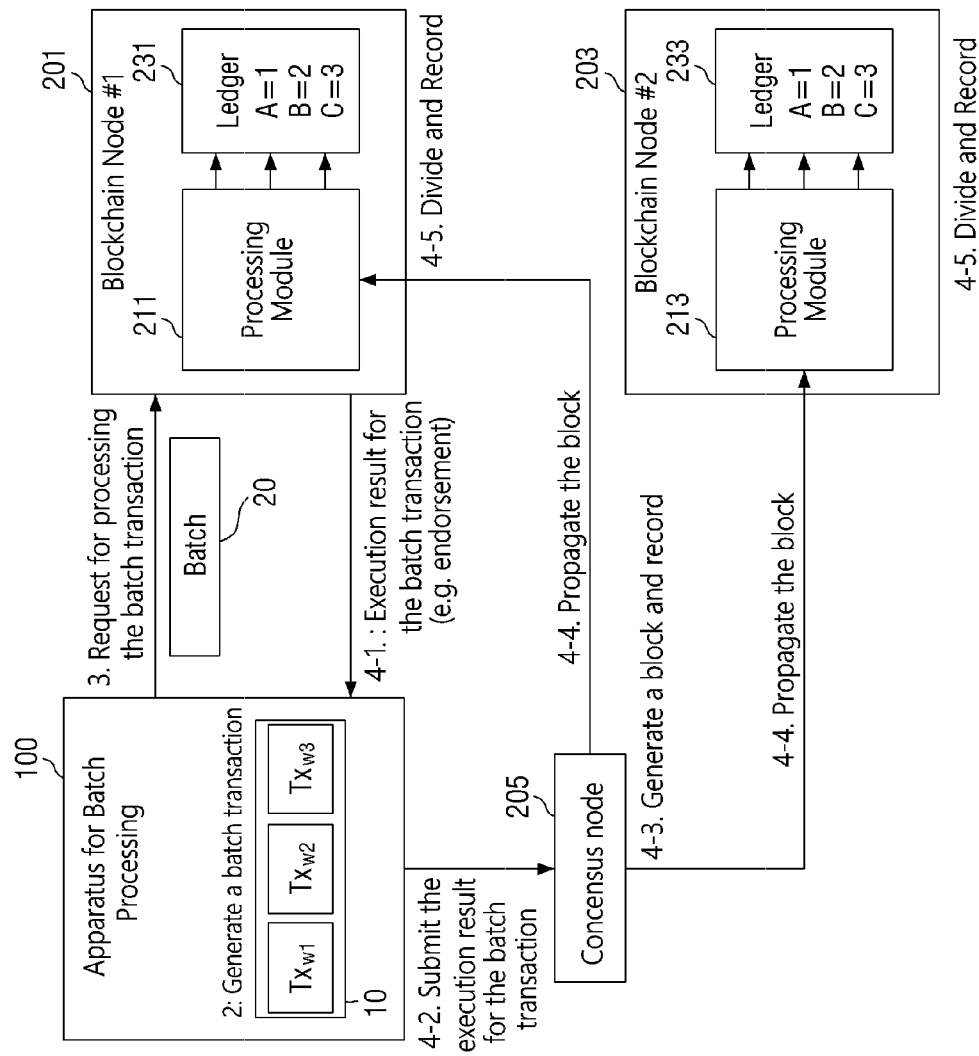
Figure 7:
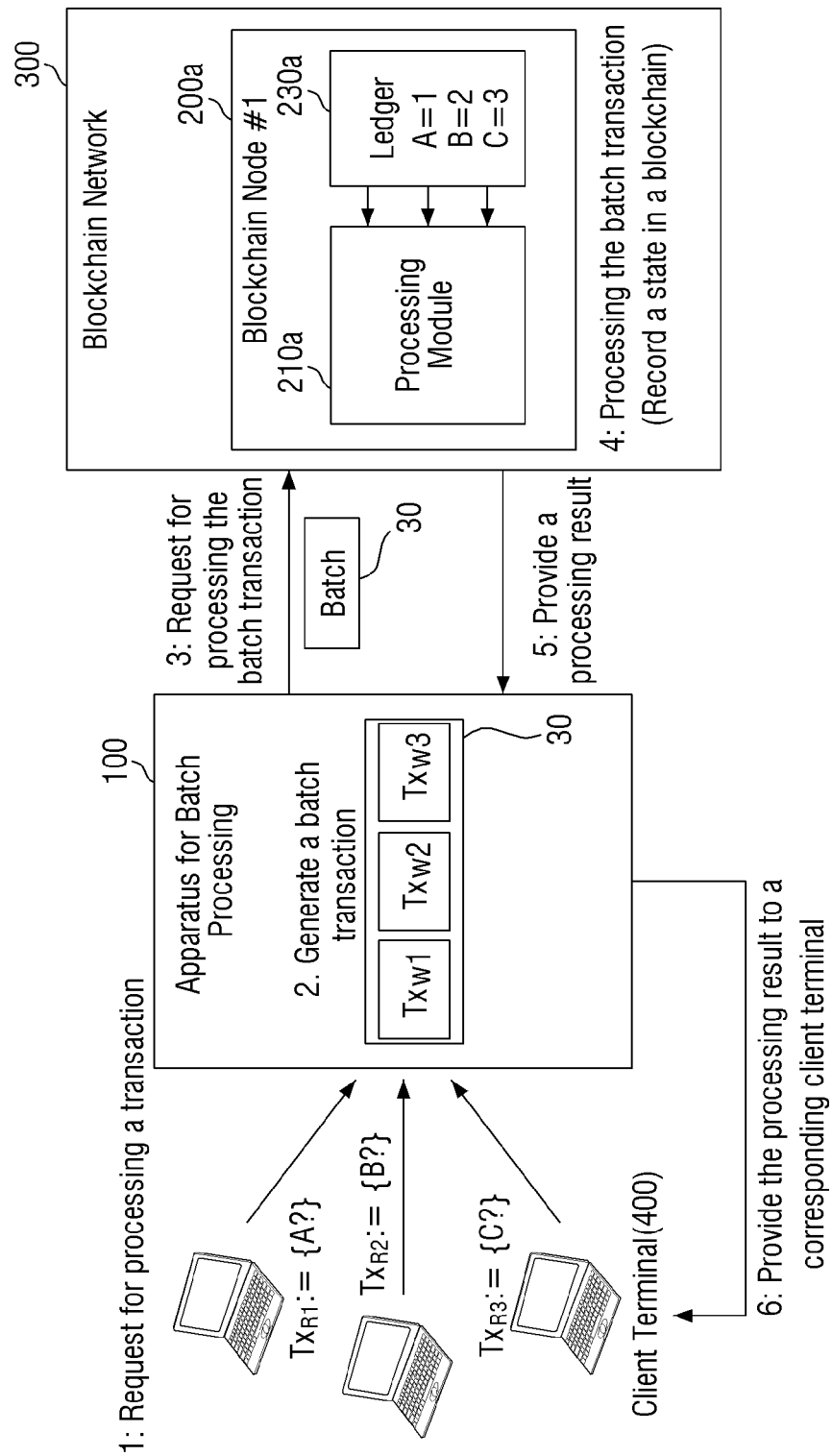
FIG. 7 is a diagram for describing a process of processing a read type transaction according to an embodiment of the present invention.

For more detailed description of the handler module 150, refer to the description of FIGS. 5 to 7.

Next, the result providing module 170 receives the processing result for the individual transaction or the batch transaction from the reception handler 153, and provides the processing result to the client terminal 400. More specifically, the result providing module 170 may divide the processing result for the batch transaction into individual transaction units, and provide the divided processing result to each client terminal 400. For example, the result providing module 170 may generate a reference table including an identifier of the client terminal 400, a transaction identifier, an address of the client terminal 400, or the like, and provide the processing result of the individual transaction to the corresponding client terminal 400 using the reference table. However, the technical scope of the present invention is not limited thereto.

Next, the batch size adjusting module 190 monitors a transaction processing status and variably adjusts the setting value of the batch size based on the monitoring result. In addition, the batch size adjusting module 190 may activate or deactivate the batch processing function based on the monitoring result. Here, deactivating the batch processing function may be performed by adjusting the setting value of the batch size to "1", but may be performed in any other way.

In order to exclude the redundant description, a more detailed description of the operation of the batch size adjusting module 190 will be described in detail with reference to FIG. 12 and the subsequent drawings.

Each component illustrated in FIG. 4 may refer to software or hardware such as a field programmable gate array (FPGA) or an application-specific integrated circuit (ASIC). However, the components are not limited to software or hardware, and may be configured to be in an addressable storage medium or may be configured to execute one or more processors. Functions provided in the components may be implemented by more detailed components or may be implemented as one component that performs a specific function by combining a plurality of components.

Meanwhile, according to another embodiment of the present invention, the batch processing function described above may be implemented on the client terminal 400 side. For example, when a specific client terminal 400 generates the plurality of transactions, a batch transaction may be generated by aggregating the plurality of blockchain transactions directly. For another example, when the specific client terminal 400 receives a plurality of transactions from another client terminal, a batch transaction may be generated by aggregating the plurality of transactions.

Hereinafter, for convenience of understanding, a process of writing and reading type transactions through the apparatus for batch processing 100 will be described with reference to FIGS. 5 to 7. FIGS. 5 to 7 show an example in which the setting value of the batch size is "3".

FIG. 5 shows a process in which a write type transaction is processed according to an embodiment of the present invention.

Referring to FIG. 5, the apparatus for batch processing 100 generates a batch transaction 10 by aggregating a plurality of write type transactions $Tx_{w1}$, $Tx_{w2}$, and $Tx_{w3}$. In detail, according to the classification result of the classification module 110, the batch generation module 130 may insert the write type transactions $Tx_{w1}$, $Tx_{w2}$, and $Tx_{w3}$ into the same batch queue, and the batch transaction 10 may be generated in response to determining that the number of write type transactions $Tx_{w1}$, $Tx_{w2}$, and $Tx_{w3}$ inserted into the batch queue satisfies the setting value of the batch size.

Next, the apparatus for batch processing 100 requests the blockchain network 300 to process the batch transaction 10. Then, the blockchain nodes 200a and 200b constituting the blockchain network 300 perform the consensus process for the batch transaction 10 and record the execution result of the batch transaction 10 on the blockchains 230a and 230b.

As shown in FIG. 5, each blockchain node 230a and 230b may include a processing module 210a, 210b for processing the batch transaction 10. The processing module 210a or 210b may use the smart contract to divide the execution result of the batch transaction 10 by transactions (or by state data), and update the blockchain-based on the divided execution results. Here, the execution result of the batch transaction 10 may include a signature of the blockchain node, an identifier of the individual transaction, identification keys A, B, and C and values 1, 2, and 3 of status data, or the like. Accordingly, the processing module 210a or 210b may divide the execution result of the batch transaction 10 by transaction (or by state) by using the identification keys A, B, and C and/or the identifier of the transaction. In addition, the processing module 210a or 210b may further perform a process for the batch transaction generated based on the read type transaction, which will be described later with reference to FIG. 8.

Next, the apparatus for batch processing 100 receives the processing result for the batch transaction 10 from the blockchain network 300, and provides the received processing result to the corresponding client terminal 400.

Here, when the processing result indicates a failure, the handler module 150 of the apparatus for batch processing 100 may retry the processing of the batch transaction 10.

FIG. 6 shows a process in which a write type batch transaction is processed in an environment in which a separate consensus node exists such as Hyperledger Fabric.

As shown in FIG. 6, the apparatus for batch processing 100 generates a batch transaction 20 and sends the generated batch transaction 20 to the blockchain node 201. In addition, the apparatus for batch processing 100 receives an execution result of the batch transaction 20 from the blockchain node 201. As described above, the execution result may include a signature of the blockchain node for the batch transaction 20, the identification keys A, B, and C and values 1, 2, and 3 of the state data, or the like.

Next, the apparatus for batch processing 100 submits the received execution result to a separate consensus node 205. Then, the consensus node 205 verifies the batch transaction 20 based on the execution result of the blockchain node 201, records the execution result to a new block, and propagates the new block onto the blockchain network 300. Finally, each blockchain node 201 and 203 receiving the new block divides the execution result of the batch transaction 20 by transaction (or by state data) through the processing module 211 and updates the blockchain-based on the divided execution results.

As described with reference to FIGS. 5 and 6, when the transaction is processed through the apparatus for batch processing 100, the plurality of transactions may be batch processed through batch processing. In other words, the consensus process is not performed on an individual transaction basis, but the plurality of transactions may be batch processed by performing the consensus process on a batch transaction basis. Accordingly, the performance of processing the transaction may be dramatically improved. In an ideal environment, the performance of processing the transaction would be improved in proportion to the batch size.

Hereinafter, a process of processing a read type transaction according to an embodiment of the present invention will be described with reference to FIG. 7.

Referring to FIG. 7, the apparatus for batch processing 100 generates a batch transaction 30 by aggregating read type transactions $Tx_{R1}$, $Tx_{R2}$, and $Tx_{R3}$, and requests the blockchain network 300 to process the batch transaction 30.

The blockchain node 200*a* received the request divides the batch transaction 20 by transaction (or by status data) through the processing module 210*a*, and inquires the state data A, B, and C recorded in the blockchain. The dividing process may be performed through the smart contract based on the transaction identifier and/or the identification keys A, B, and C of the state data.

Next, the apparatus for batch processing 100 may receive a processing result (in other words, a value of the inquired state data) of the batch transaction 30 from the blockchain node 200*a*, and provide the processing result to the corresponding client terminal 400.

Here, when the processing result indicates a failure, the handler module 150 of the apparatus for batch processing 100 may retry the processing of the batch transaction 30.

The process of processing the read type transaction through the apparatus for batch processing 100 has been described with reference to FIG. 7. As described above, since a plurality of read-type transactions may be batch processed in a batch form, the performance of processing the transaction may be greatly improved.

Hereinafter, a hardware configuration of the apparatus for batch processing 100 according to an embodiment of the present invention will be described with reference to FIG. 8.

Figure 8:
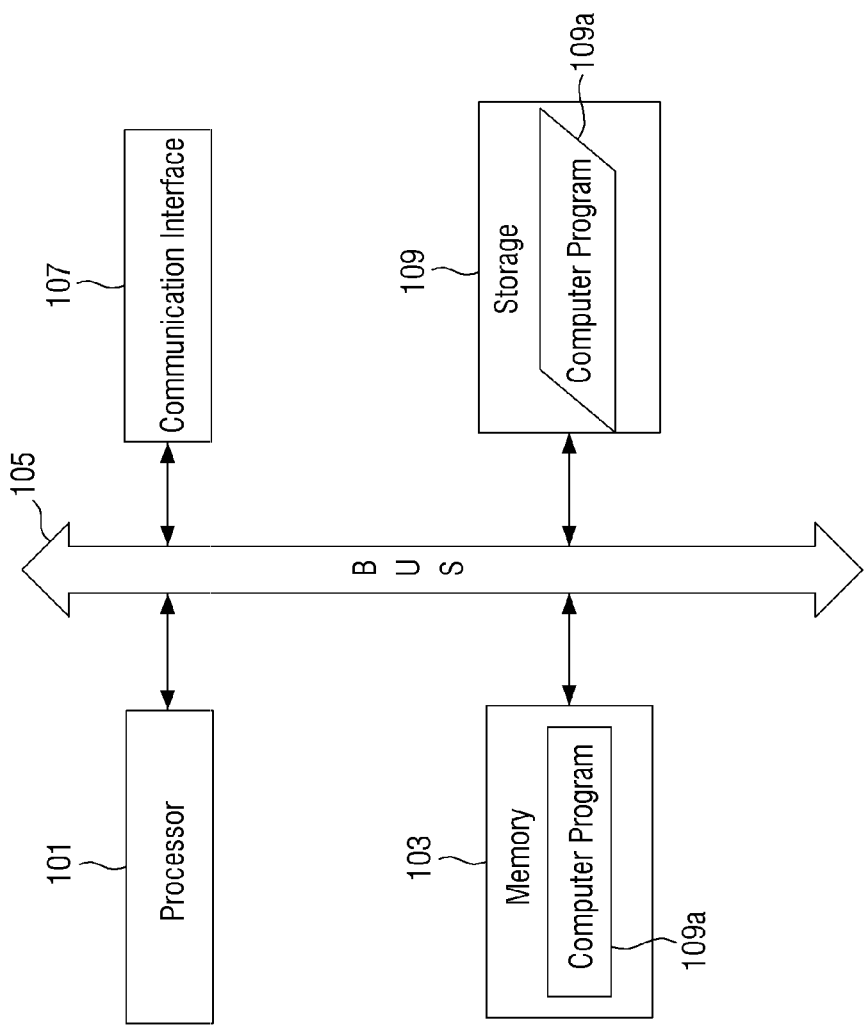
FIG. 8 is a hardware diagram illustrating an apparatus for batch processing according to an embodiment of the present invention.

Referring to FIG. 8, the apparatus for batch processing 100 may include a one or more processors 101, a bus 105, a communication interface 107, a memory 103 to load a computer program executed by the processor 101, and a storage 109 to store a computer program 109*a*. However, FIG. 8 illustrates only components related to an embodiment of the present invention. Accordingly, it will be appreciated by those skilled in the art that the present invention may further include other general purpose components in addition to the components illustrated in FIG. 8.

The processor 101 controls the overall operation of each component of the apparatus for batch processing 100. The processor 101 may be configured to include a central processing unit (CPU), a microprocessor unit (MPU), a micro controller unit (MCU), a graphics processing unit (GPU), or any type of processor well known in the art. In addition, the processor 101 may perform an operation on at least one application or program for executing a method according to embodiments of the present invention. The apparatus for batch processing 100 may have one or more processors.

The memory 103 stores various data, commands, and/or information. The memory 103 may load one or more programs 109*a* from the storage 109 to execute methods according to some embodiments of the present invention. For example, when the computer program 109*a* is loaded into the memory 103, a logic (or a module) as shown in FIG. 4 may be implemented on the memory 103. An example of the memory 103 may be a RAM but is not limited thereto.

The bus 105 provides a communication function between components of the apparatus for batch processing 100. The bus 105 may be implemented as various types of buses such as an address bus, a data bus, a control bus, or the like.

The communication interface 107 supports wired and wireless Internet communication of the apparatus for batch processing 100. The apparatus for batch processing 100 may communicate with the blockchain network 300 and/or the client terminal 400 via the communication interface 107.

The communication interface 107 may support various communication manners other than internet communication. To this end, the communication interface 107 may be configured to include a communication module well known in the art.

The storage 109 may non-temporarily store the one or more computer programs 109*a*. The storage 109 may be configured to include a non-volatile memory such as a read only memory (ROM), an erasable programmable ROM (EPROM), an electrically erasable programmable ROM (EEPROM), or a flash memory, a hard disk, a removable disk, or any form of computer readable recording medium well known in the art to which the present invention belongs.

The computer program 109*a* may be loaded into the memory 103, and include instructions that cause the processor 101 to perform methods in accordance with some embodiments of the present invention.

For example, the computer program 109*a* may include instructions to perform operations for obtaining a plurality of blockchain transactions, generating a batch transaction by aggregating at least some of the plurality of blockchain transactions, and processing the batch transaction via a blockchain network.

In addition, the computer program 109*a* may further include instructions to perform an operation of adjusting a setting value of a batch size based on a monitoring result of a transaction processing status.

The configuration and operation of the apparatus for batch processing 100 according to an exemplary embodiment of the present invention have been described with reference to FIGS. 5 to 8. Hereinafter, a method for batch processing according to some embodiments of the present invention will be described in detail with reference to FIGS. 9 through 16.

Hereinafter, each step of the method for batch processing according to some embodiments of the present invention may be performed by a computing apparatus. For example, the computing apparatus may be the apparatus for batch processing 100 or another apparatus constituting the transaction processing system shown in FIG. 1. For convenience of description, the description of the operation subject of each step included in the method for batch processing may be omitted. In addition, each step of the method for batch processing may be implemented with one or more instructions constituting a computer program, and a processor may perform the method for batch processing by executing the one or more instructions.

Figure 9:
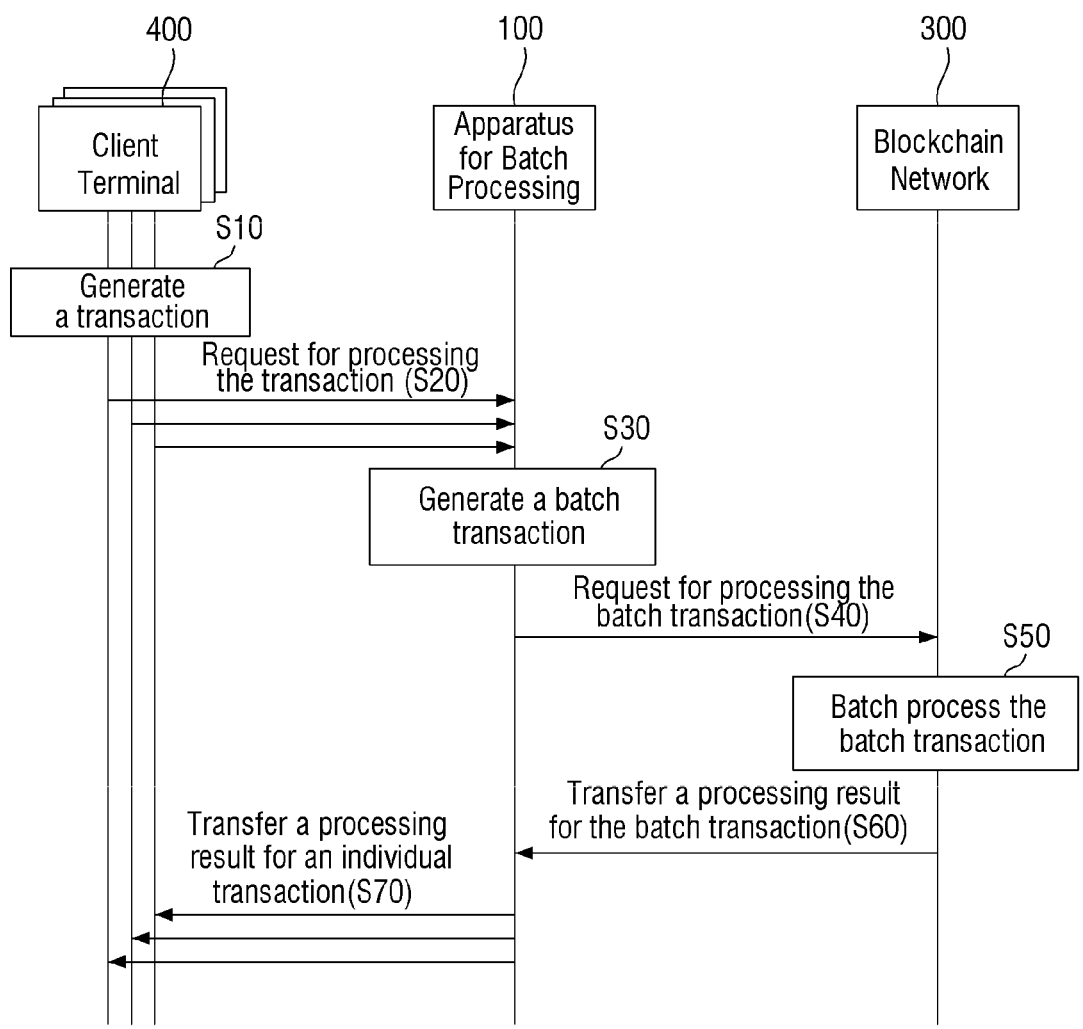
FIGS. 9 to 11 are flowcharts illustrating a method for batch processing on a blockchain transaction according to a first embodiment of the present invention.

FIG. 9 is a flowchart showing a method for batch processing according to a first embodiment of the present invention. However, this is only a preferred embodiment for achieving the object of the present invention. Naturally, some steps may be added or deleted as necessary.

Referring to FIG. 9, the method for batch processing starts at steps S10 and S20 of at least one client terminal 400 generating a transaction and requesting processing of the transaction.

In step S30, the apparatus for batch processing 100 generates a batch transaction by aggregating a plurality of transactions. A detailed description of this step S30 will be described later with reference to FIGS. 10 and 1.

In step S40, the apparatus for batch processing 100 transfers the generated batch transaction to the blockchain network 300.

In step S50, the batch transaction is batch processed by the plurality of blockchain nodes 200 constituting the blockchain network 300. For example, the plurality of blockchain nodes 200 perform the consensus process for the batch transaction, and each blockchain node 200 records the execution result of the batch transaction on the blockchain. As described above, each blockchain node 200 may use the smart contract-based processing module (e.g. 210a and 210b of FIG. 5) to divide the execution result and update the blockchain.

In step S60, the blockchain network 300 transfers the processing result of the batch transaction to the apparatus for batch processing 100. Here, the processing result may include information indicating success or failure.

In step S70, the apparatus for batch processing 100 divides the processing result of the batch transaction into the processing result of the individual transaction, and provides the processing result of the individual transaction to the client terminal 400 requesting the transaction. In addition, the apparatus for batch processing 100 clears the batch queue corresponding to the batch transaction and removes the transaction stored in the batch queue.

When the processing of the batch transaction has failed, the apparatus for batch processing 100 may retry the processing of the batch transaction. By doing so, the reliability of the transaction processing process may be secured. The manner of performing the retry may vary depending on embodiments.

In an embodiment, the apparatus for batch processing 100 may individually retry a transaction that caused the failure among the plurality of transactions included in the batch transaction. In addition, the apparatus for batch processing 100 may retry the remaining transactions again in a batch form.

In another embodiment, the apparatus for batch processing 100 may retry only the processing of the remaining transactions individually or in a batch form, except for the transaction that caused the failure among the plurality of transactions included in the batch transaction. This is because it is highly likely to fail again if the processing of the transaction that failed once is attempted again. In the embodiment, for the transaction that caused the failure, the apparatus for batch processing 100 will immediately provide the processing result (in other words, failure) to the client terminal 400.

For reference, among steps S30, S40, S60, and S70 described above, step S30 may be performed by the classification module 110 and the batch generation module 130, steps S40 and S60 may be performed by the handler module 150, and step S70 may be performed by the result providing module 170.

Next, a process of generating a batch transaction in step S30 described above will be described with reference to FIGS. 10 and 11.

Figure 10:
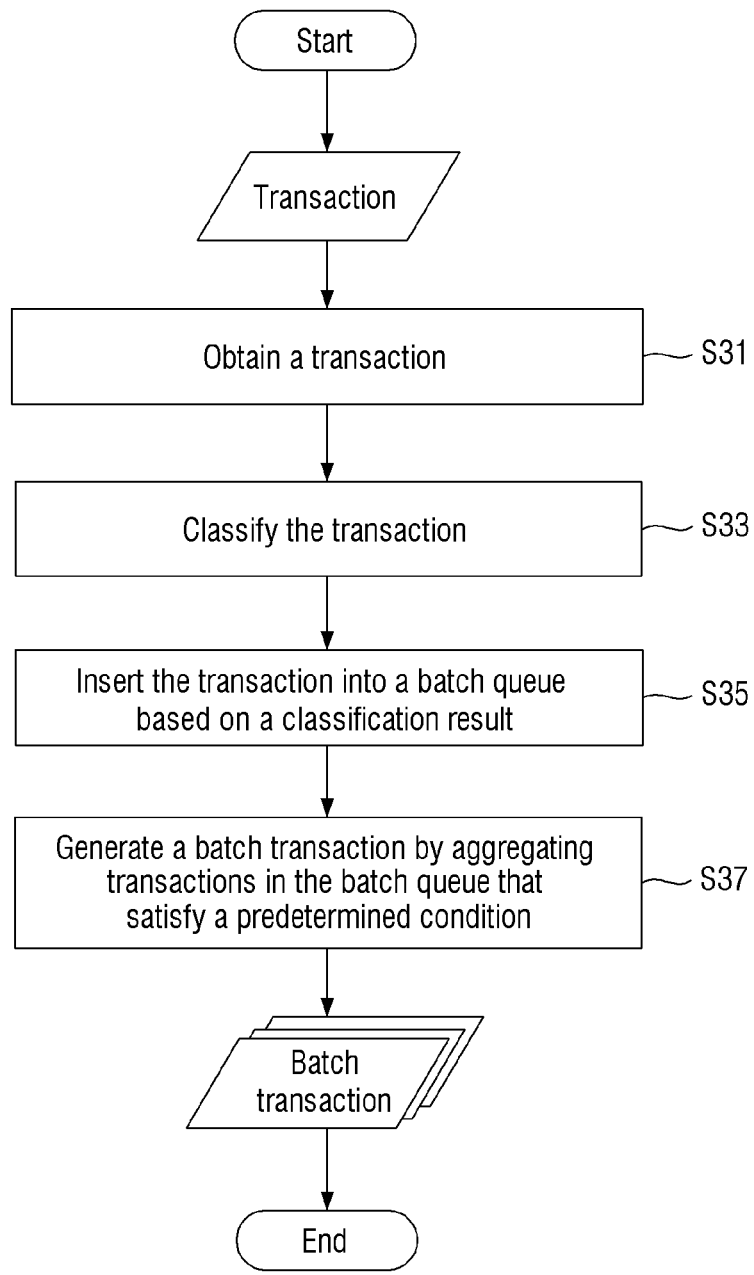

FIG. 10 is a flowchart illustrating a method for generating a batch transaction according to an embodiment of the present invention. However, this is only a preferred embodiment for achieving the object of the present invention. Naturally, some steps may be added or deleted as necessary.

As shown in FIG. 10, the method for generating the batch transaction starts at step S31 in which the apparatus for batch processing 100 obtain a transaction. For example, the apparatus for batch processing 100 may receive a transaction from the client terminal 400.

In step S33, the apparatus for batch processing 100 classifies the transaction according to a predetermined classification criterion. The predetermined classification criteria may include, for example, a channel identifier, a smart contract identifier, a type of transaction, importance of a transaction, or the like. However, this is only for explaining some embodiments of the present invention, but the scope of the present invention is not limited to the examples listed above.

In step S35, the apparatus for batch processing 100 inserts each transaction into a batch queue based on a classification result. For example, the apparatus for batch processing 100 may insert a write type transaction for a first smart contract of a first channel into a first batch queue, and insert a read type transaction for the first smart contract of the first channel into a second batch queue. As another example, the apparatus for batch processing 100 may insert a first transaction with first importance into a first batch queue with high priority, and insert a second transaction with second importance into a second batch queue with low priority.

However, as described above, the apparatus for batch processing 100 may process some transactions with the high priority individually without inserting them into the batch queue. In addition, the apparatus for batch processing 100 may remove a transaction having an association among the transactions inserted in the batch queue, and then process it individually.

In step S37, the apparatus for batch processing 100 generates a batch transaction by aggregating the transactions in the batch queue that satisfy the predetermined batch generating condition.

According to some embodiments of the present invention, the batch generation condition may include a first condition based on a batch timer, a second condition based on a data size of a transaction, a third condition based on the number of transactions, a fourth condition based on either the presence or absence of association between transactions, or the like. In addition, the predetermined batch generation condition may further include a fifth condition that may be defined based on a combination of the first condition to the fourth condition. Hereinafter, for convenience of understanding, the process of generating a batch transaction according to each batch generation condition will be described in detail.

In the first embodiment, the apparatus for batch processing 100 may generate a batch transaction by aggregating the transactions in the specific batch queue in response to an expiration event of the batch timer. Here, the batch timer may exist for each batch queue, but the scope of the present invention is not limited thereto. A timer period of each batch queue may be the same or may be different. For example, a timer period of a batch queue with high priority may be set relatively short, and a timer period of a batch queue with low priority may be set relatively long. Thus, a differential transaction processing service may be provided. According to the present embodiment, a transaction waiting time due to the batch processing may be limited within a predetermined time (e.g. a batch timer period). Thus, the problem of delaying the processing of some individual transactions due to the batch processing may be alleviated.

In the second embodiment, the apparatus for batch processing 100 may generate a batch transaction in response to determining that a data size of the entire transaction included in a specific batch queue is greater than or equal to a threshold value. Here, the data size of the entire transaction may be calculated as a sum of the data sizes of the individual transactions, and the data size of the individual transactions may mean, for example, a size of transaction data recorded in the blockchain. However, the technical scope of the present invention is not limited thereto. The threshold value may be a predetermined fixed value or a changeable variation value that varies depending on a status. For example, the threshold value may be a fixed value set based on the maximum size of the block. For another example, the threshold value may be a fixed value or a variation value set based on a priority of the corresponding batch queue. As another example, the threshold value may be a variation value that is set to a larger value as a load of the apparatus for batch processing 100 increases. According to the embodiment, it may be prevented that too much data is included in one batch transaction, and thus, the probability of failing to process a batch transaction may be decreased.

In a third embodiment, the apparatus for batch processing 100 may generate a batch transaction in response to determining that the number of transactions included in the specific batch queue satisfies a setting value of the batch size. Here, the setting value may be a changeable variation value that varies depending on a status. For example, the setting value may be a variation value set to a smaller value as a priority of the corresponding batch queue increases. For another example, the setting value may be a variation value adjusted depending on a transaction processing status such as a load of the apparatus for batch processing 100, a transaction processing time, or the like. A detailed description of a method for adjusting a setting value of a batch size will be described in detail with reference to FIG. 12 and the subsequent drawings.

In a fourth embodiment, the apparatus for batch processing 100 may generate a batch transaction based on association between the transactions. Specifically, the apparatus for batch processing 100 determines whether there is an associated transaction of a specific transaction. Here, the associated transaction refers to a transaction in which an association exists with the specific transaction. For example, it may be transaction including an identification key of the same state data as the specific transaction. In other words, transactions that access the same state data as the specific transaction may be determined to be an associated transaction that has an association with the specific transaction. When it is determined that there is the associated transaction, the apparatus for batch processing 100 may perform the batch processing in a variety of ways. Specific examples are as follows.

In a 4-1th embodiment, the apparatus for batch processing 100 may generate and process a first transaction and a second transaction having an association as different batch transactions.

In a 4-2th embodiment, the apparatus for batch processing 100 may generate a batch transaction based on the remaining transactions except for the first transaction and the second transaction in which the association exists, and process the first transaction and the second transaction individually.

In a 4-3th embodiment, the apparatus for batch processing 100 may process the first transaction in a batch form among the first transaction and the second transaction in which an association exists, and process the second transaction individually. In other words, the apparatus for batch processing 100 may process some of the plurality of transactions in which the association exists in a batch form within a range in which a transaction conflict does not occur.

In a 4-4th embodiment, the apparatus for batch processing 100 may determine whether the first transaction and the second transaction in which the association exists may be combined, and generate a third transaction in which the first transaction and the second transaction are combined in response to determining that they may be combined. Here, when an execution result of the third transaction is the same as a result of executing the first transaction and the second transaction, a method for generating the third transaction may be performed in any manner. In addition, the apparatus for batch processing 100 may process the third transaction in the batch form or individually.

According to the embodiments described above, the batch processing may be performed within a range in which a collision does not occur in consideration of an association between transactions. Accordingly, the problem that the stability of transaction processing is lowered may be alleviated. In the embodiments described above, for convenience of understanding, it has been described assuming that there is an association between two transactions, but those skilled in the art will readily understand that even if there is an association between three or more transactions, they may be processed in the same or similar manner.

Figure 11:
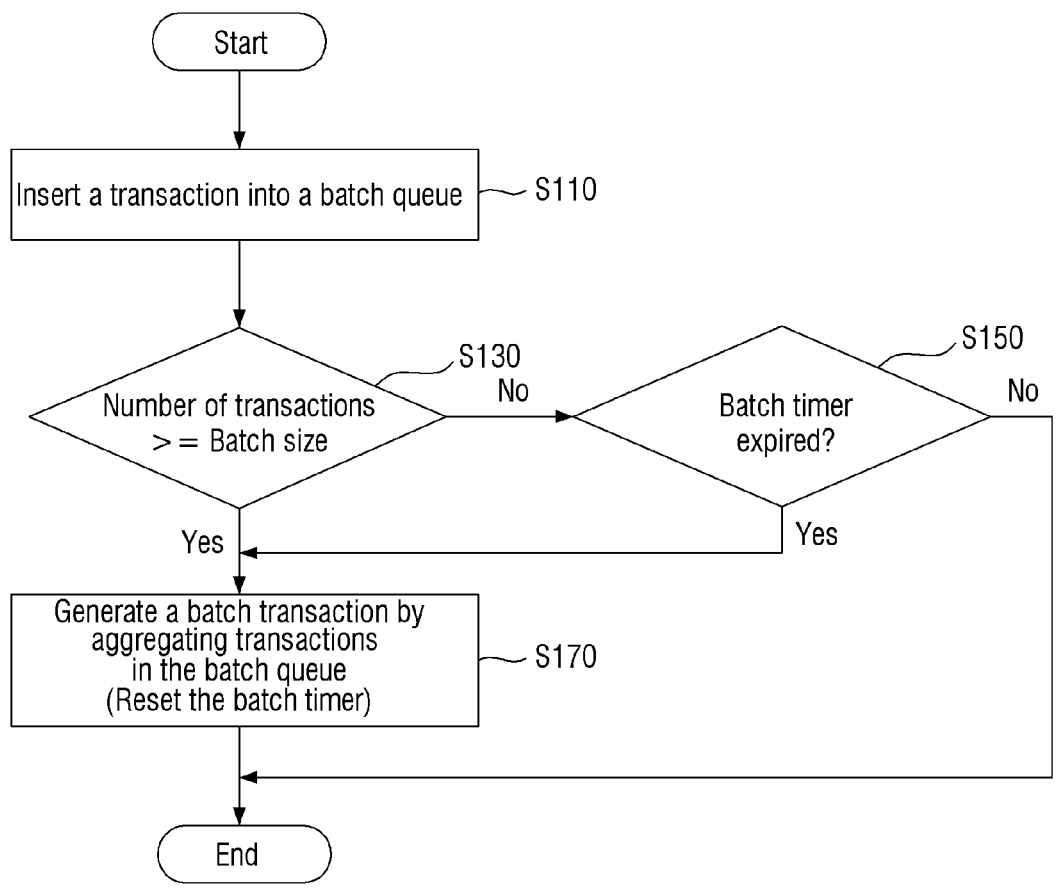

In a fifth embodiment, the apparatus for batch processing 100 may generate a batch transaction based on a combination of the embodiments described above. For example, as shown in FIG. 11, the apparatus for batch processing 100 may further generate a batch transaction using the batch timer as well as the batch size. Specifically, the apparatus for batch processing 100 may generate a batch transaction in response to determining that the number of transactions of the specific batch queue is equal to or larger than the batch size (S110 to S170). In addition, even when the number of transactions of the specific batch queue is less than the batch size, the apparatus for batch processing 100 may generate a batch transaction in response to an expiration event of the batch timer (S150 and S170). By doing so, the transaction processing performance may be improved while minimizing processing delay due to the batch processing.

For reference, among the above-described steps S31 to S37 and S110 to S170, steps S31 to S35 may be performed by the classification module 110, and steps S37 and S110 to S170 may be performed by the batch generation module 130.

The method for batch processing according to the first embodiment of the present invention has been described with reference to FIGS. 9 to 11. According to the method described above, by processing the plurality of transactions in the batch form, the transaction processing performance of the blockchain-based system may be greatly improved. In particular, since the method described above is performed by a separate apparatus for batch processing 100, an internal logic of the blockchain-based system does not need to be modified. Thus, excellent portability is provided and may be widely used in various blockchain-based systems.

Hereinafter, a method for batch processing according to the second embodiment of the present invention will be described with reference to FIG. 12 and the subsequent drawings. In the description of the method for batch processing according to the second embodiment, a description of overlapping contents with the first embodiment described above will be omitted.

Figure 12:
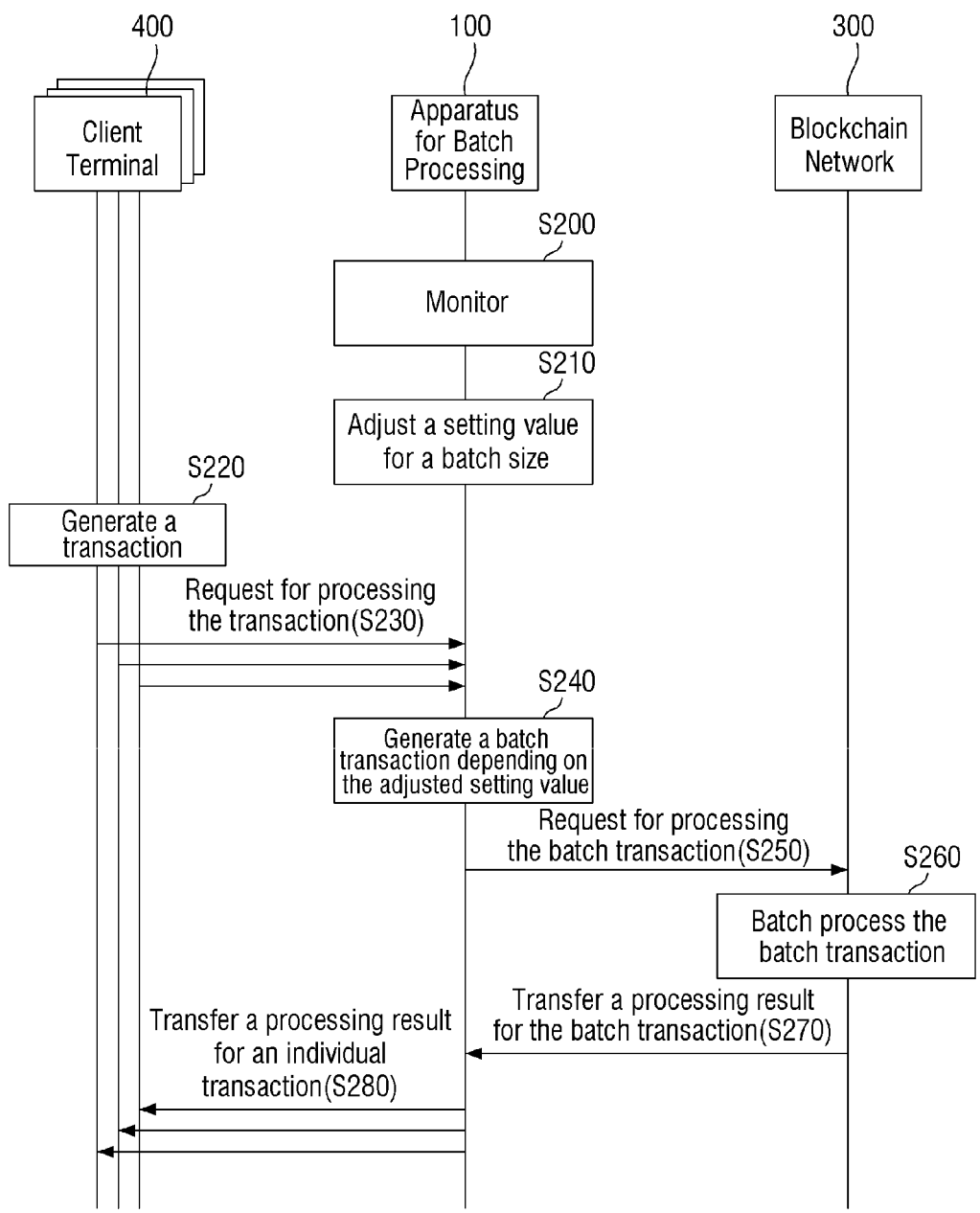
FIG. 12 is a flowchart illustrating a method for batch processing on a blockchain transaction according to the second embodiment of the present invention.

FIG. 12 is a flowchart illustrating a method for batch processing on a blockchain transaction according to the second embodiment of the present invention. However, this is only a preferred embodiment for achieving the object of the present invention. Naturally, some steps may be added or deleted as necessary.

As shown in FIG. 12, the apparatus for batch processing 100 may further perform step S200 of monitoring a transaction processing status and step S210 of adjusting a setting value of a batch size depending on a monitoring result. For reference, step S200 of monitoring and step S210 of adjusting may be performed by the batch size adjusting module 190.

Step S200 of monitoring is a step in which the apparatus for batch processing 100 monitors various monitoring indicators associated with a transaction processing status. Here, the monitoring indicators associated with the transaction processing status may include the number of incoming transactions, the number of outgoing transactions, a time required for processing a transaction, a load of the apparatus for batch processing 100 or the blockchain network 300, whether a transaction processing failure event occurs, a waiting time of a transaction, etc. However, the technical scope of the present invention is not limited thereto.

Step S210 of adjusting the batch size is a step of adjusting a setting value of the batch size or activating or deactivating the batch processing function based on the monitoring result. In the following description, activating the batch processing function may be understood as activating a corresponding function when the batch processing function is deactivated. Equally, deactivating the batch processing function may be understood to deactivate the corresponding function when the batch processing function is activated.

FIG. 12 shows that step S200 of monitoring and step S210 of adjusting the batch size precede the other steps S220 to S280. However, those skilled in the art will appreciate that tstep S200 of monitoring and step S210 of adjusting the batch size may be performed in any order with the other steps S220 to S280. For example, step S200 of monitoring may be continuously performed while steps S230 to S280 of processing transactions are performed. Naturally, step S210 of adjusting the batch size may also be performed independently of steps S230 to S280 of processing the transactions.

In step S200 of monitoring and step S210 of adjusting the batch size, a specific process of adjusting the batch size depending on each monitoring indicators will be described with reference to FIG. 13 and the subsequent drawings.

Figure 13:
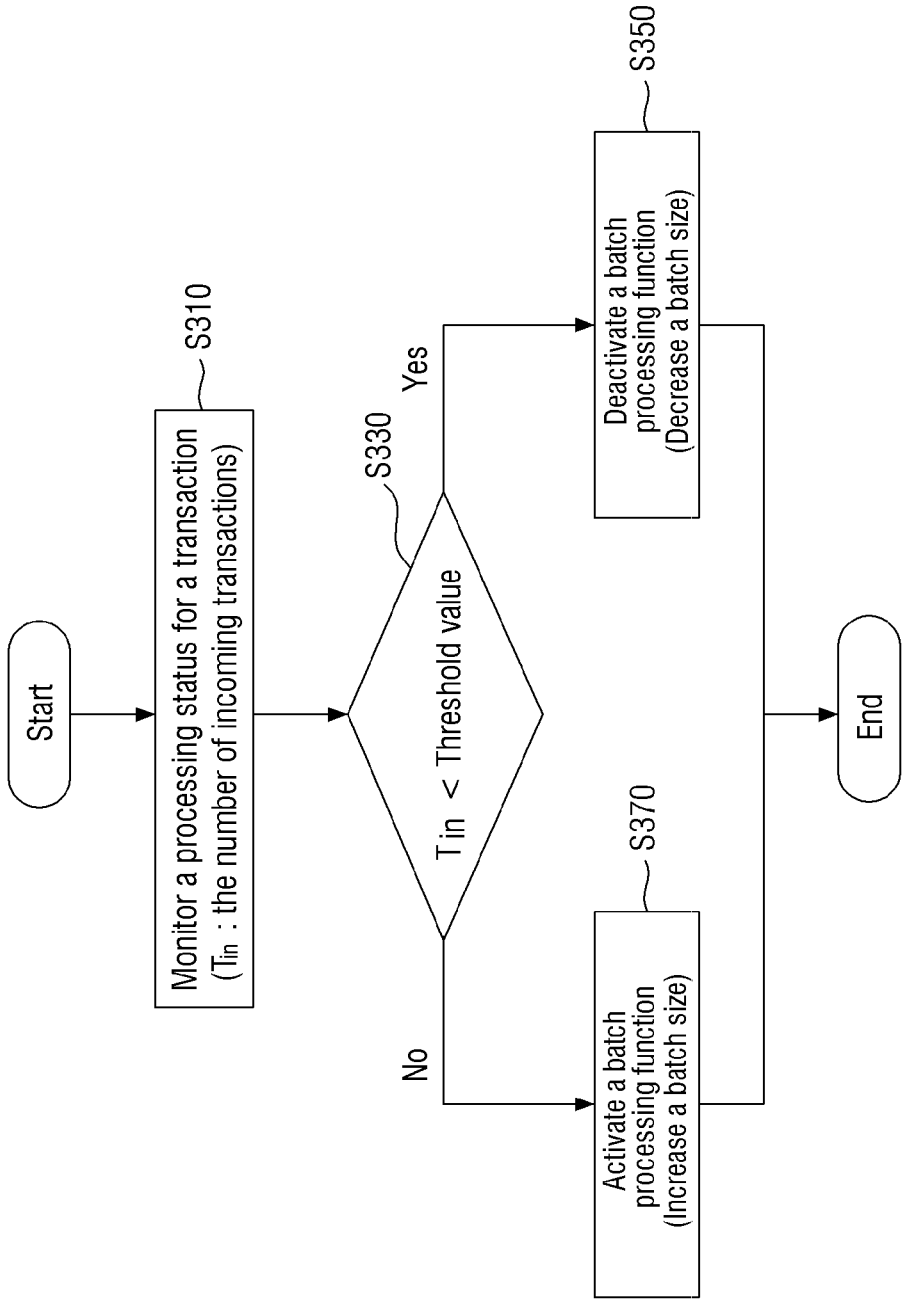
FIGS. 13 to 16 are flowcharts illustrating a method for adjusting a batch size according to some embodiments of the present invention.

FIG. 13 is a flowchart showing a method for adjusting a batch size according to a first embodiment of the present invention.

As shown in FIG. 13, the method for adjusting the batch size according to the first embodiment relates to a method for adjusting a setting value of the batch size based on the number of transactions per unit time Tin incoming to the apparatus for batch processing 100.

In detail, the method for adjusting the batch size starts at step S310 of monitoring the number of transactions per unit time Tin.

In step S330, the apparatus for batch processing 100 determines whether the number of transactions per unit time Tin is less than a threshold value. Here, since the transaction is a transaction incoming to the apparatus for batch processing 100, all of the transactions correspond to individual transactions.

The threshold value may be a predetermined fixed value or a changeable variation value that varies depending on a status. For example, the threshold value may be a fixed value (e.g. $T_{max}/2$) that is determined based on the maximum transaction throughput $T_{max}$ of the apparatus for batch processing 100 or the blockchain network 300.

In response to determining that the transaction number per unit time Tin is less than the threshold value, step S350 may be performed. In step S350, the apparatus for batch processing 100 may deactivate the batch processing function or decrease the setting value of the batch size. This is because the batch processing may cause additional delays in transaction processing (e.g., delays caused by waiting in a batch queue), which may increase a processing time of some transactions. In addition, since the risk of failure of processing a batch transaction is greater than the risk of failure of processing individual transactions, it may be more advantageous to deactivate the batch processing function in status where the improvement of performance is not required.

In contrast to the above, in response to determining that the number of transactions per unit time Tin is greater than or equal to the threshold value, step S370 may be performed. In step S370, the apparatus for batch processing 100 activates the batch processing function or increases the setting value of the batch size. If the number of transactions to be processed is increasing, it is necessary to improve the transaction processing performance through the batch processing. The increase or decrease in the batch size may vary depending on embodiments.

Figure 14:
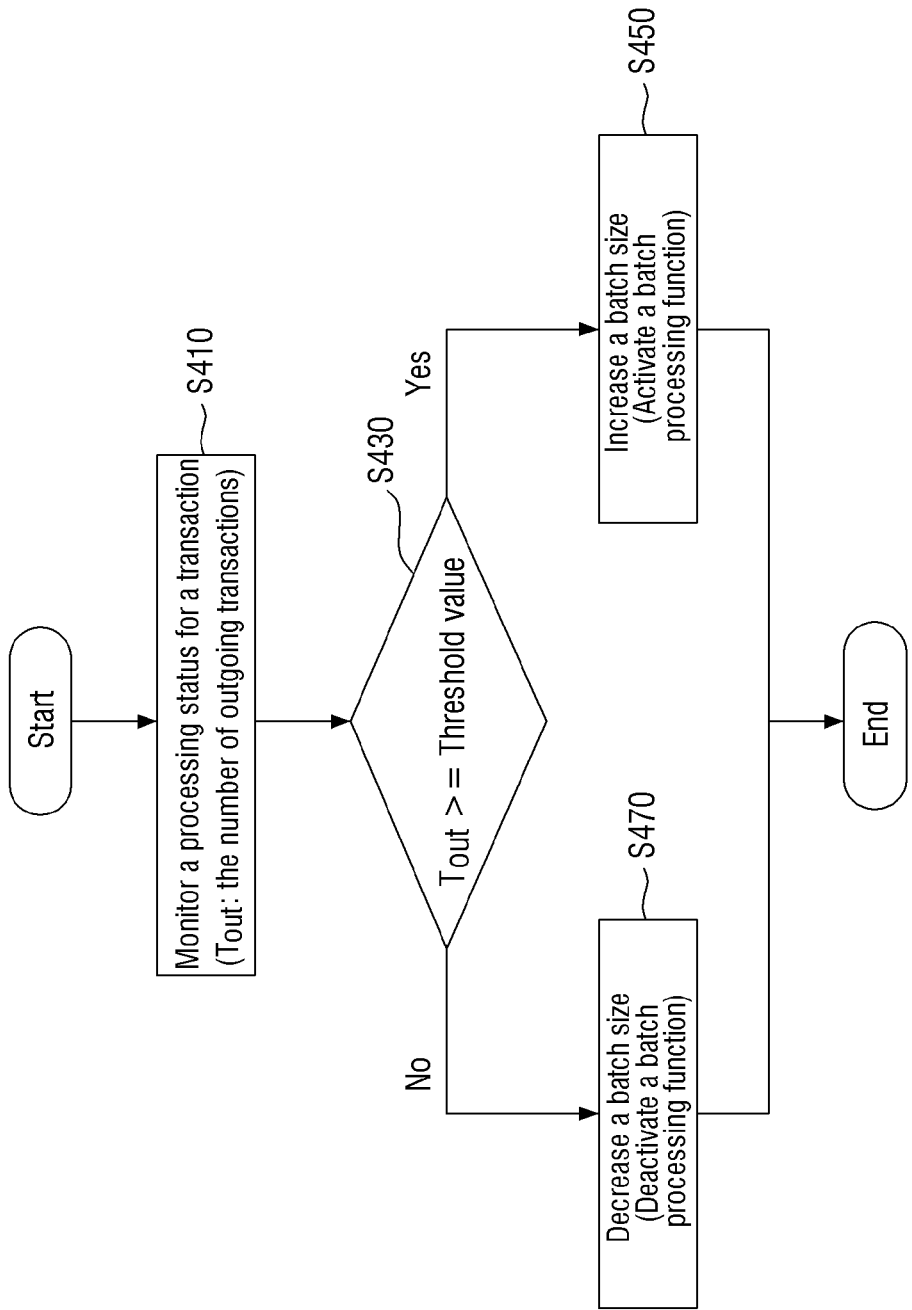

FIG. 14 is a flowchart showing a method for adjusting a batch size according to a second embodiment of the present invention.

As shown in FIG. 14, the method for adjusting the batch size according to the second embodiment relates to a method for adjusting a setting value of the batch size based on the number of transactions per unit time Tout outgoing from the apparatus for batch processing 100.

Looking into the detailed process, the method for adjusting the batch size starts at step S410 of monitoring the number of transactions per unit time Tout.

In step S430, the apparatus for batch processing 100 determines whether the number of transactions per unit time Tout is greater than or equal to a threshold value. Here, the transaction may be an individual transaction or a batch transaction because it is a transaction outgoing from the apparatus for batch processing 100. In addition, since a batch transaction is one transaction, it may be counted as one transaction in the same manner as an individual transaction.

The threshold value may be a predetermined fixed value or a changeable variation value that varies depending on a status. For example, the threshold value may be a fixed value (e.g. $T_{max}/2$) that is determined based on the maximum transaction throughput $T_{max}$ of the apparatus for batch processing 100 or the blockchain network 300.

In response to determining that the transaction number per unit time Tout is greater than or equal to the threshold value, step S450 may be performed. In step S450, the apparatus for batch processing 100 increases the setting value of the batch size or activates the batch processing function. This is because if the number of transactions per unit time Tout is increasing, it is necessary to further increase the transaction processing performance.

In contrast to the above, in response to determining that the number of transactions per unit time Tout is less than the threshold value, step S470 may be performed. In step S470, the apparatus for batch processing 100 decreases the setting value of the batch size or deactivates the batch processing function. This is because as the number of transactions included in the batch transaction reduces, the processing delay due to the batch processing may be alleviated. After the adjustment, when the number of transactions per unit time Tout becomes less than the threshold again, the setting value of the batch size may be decreased again.

Figure 15:
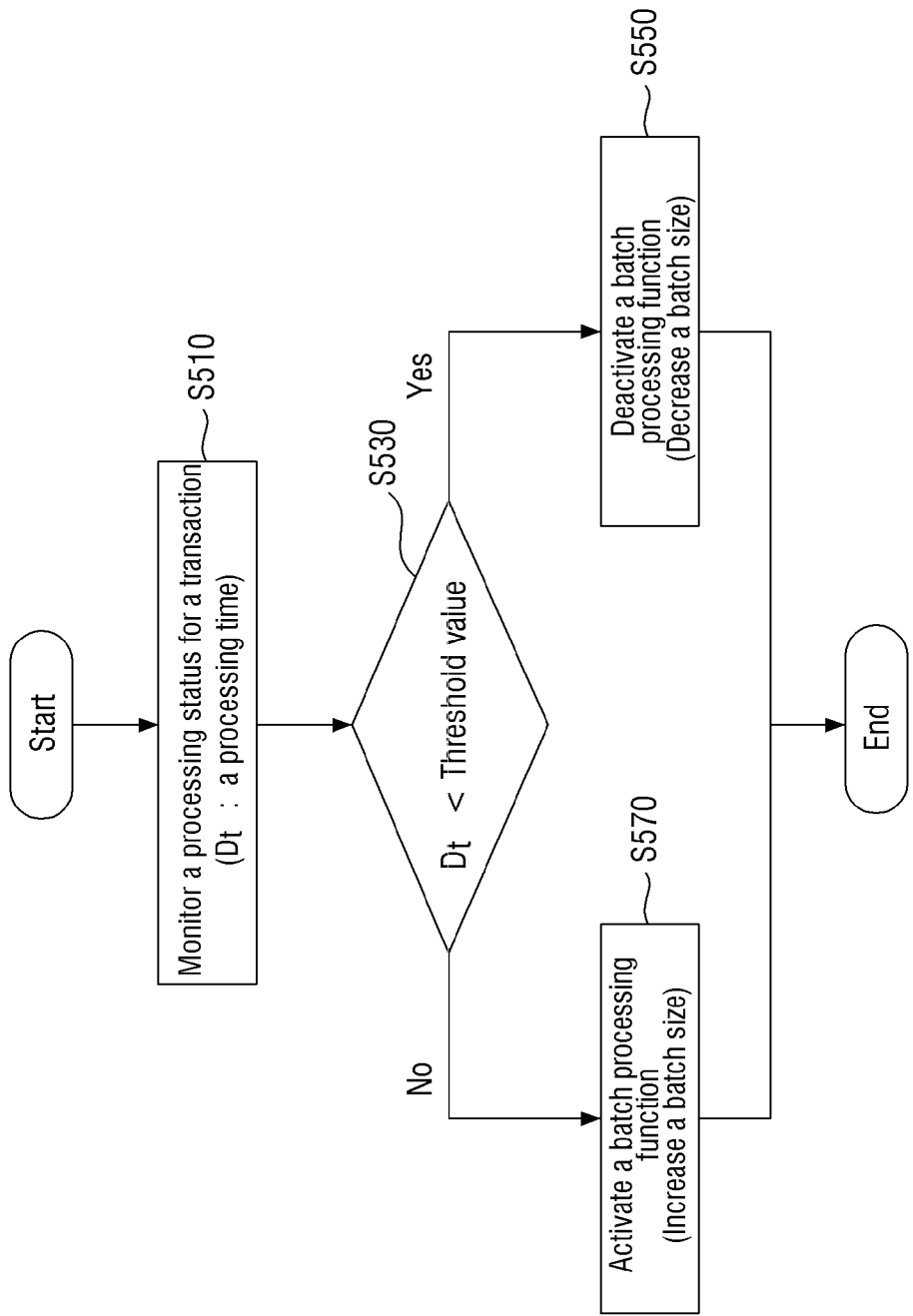

Next, FIG. 15 is a flowchart showing a method for adjusting a batch size according to a third embodiment of the present invention.

As shown in FIG. 15, the method for adjusting the batch size according to the third embodiment relates to a method for adjusting a setting value of a batch size based on a processing time of a transaction Dt. Here, the transaction may be an individual transaction or a batch transaction. In addition, the processing time Dt may mean, for example, a time taken until a consensus process for the transaction is completed, but the definition of the processing time Dt may vary depending on embodiments.

In detail, the method for adjusting the batch size starts at step S510 of monitoring the processing time Dt.

In step S530, the apparatus for batch processing 100 determines whether the processing time Dt is less than a threshold value. Here, the threshold value may be a predetermined fixed value or a changeable variation value that varies depending on a status.

In some embodiments, the threshold value may be determined based on a minimum processing time (e.g. a minimum time required for consensus). For example, the threshold value may be determined as a sum of a reference value, which is a criterion to determine a delay, and the minimum processing time. However, the technical scope of the present invention is not limited thereto. In the embodiment, the minimum processing time means a minimum time required to complete the consensus process and may include a network delay. Therefore, as the network delay becomes longer, the threshold value may also increase.

In some embodiments, the threshold value may be determined based on a transaction waiting time $W_t$. For example, the threshold value may be determined as a sum of the reference value, the minimum processing time, and the waiting time $W_t$. However, the technical scope of the present invention is not limited thereto. In the embodiment, the waiting time $W_t$ means a time for which individual transactions wait in a batch queue before a batch transaction is generated. Therefore, as the waiting time $W_t$ becomes longer, the threshold value may increase. When a batch timer is applied, a maximum value of the waiting time $W_t$ may be a setting value of a batch timer (in other words, an expiration period).

In some embodiments, the waiting time $W_t$ may be measured using the batch timer. For example, since the batch timer is reset every time a batch transaction is generated, a time that is run until immediately before the batch timer is reset may be measured as the waiting time $W_t$.

In response to determining that the processing time Dt is less than the threshold value, step S550 may be performed. In step S550, the apparatus for batch processing 100 deactivates the batch processing function or decreases the setting value of the batch size. When the transaction processing time Dt is not long, it is not necessary to increase the transaction processing performance through the batch processing.

In contrast to the above, in response to determining that the processing time Dt is greater than or equal to the threshold value, step S570 may be performed. In step S570, the apparatus for batch processing 100 activates the batch processing function or decreases the setting value of the batch size. This is because if the processing time Dt of the transaction is increasing (in other words, a delay is occurring), it is necessary to improve the transaction processing performance through the batch processing. When the batch processing function is already activated, the apparatus for batch processing 100 may perform no operation or increase the setting value of the batch size.

Figure 16:
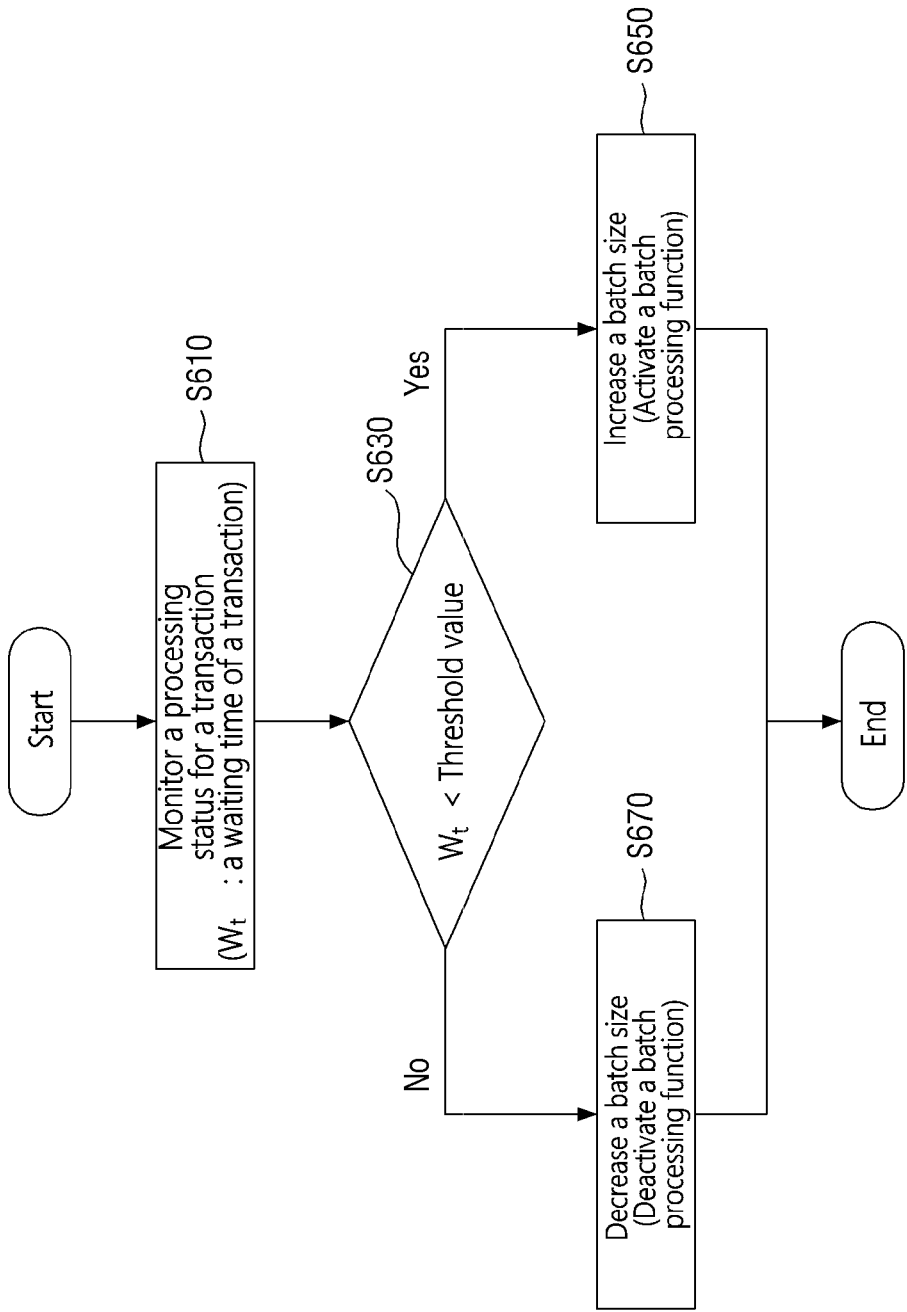

Next, FIG. 16 is a flowchart showing a method for adjusting a batch size according to a fourth embodiment of the present invention.

As shown in FIG. 16, the method for adjusting the batch size according to the fourth embodiment relates to a method for adjusting a setting value of a batch size based on a waiting time of a transaction $W_t$. As described above, the waiting time $W_t$ refers to a time that an individual transaction waits in a batch queue before a batch transaction is generated.

In detail, the method for adjusting the batch size starts at step S610 of monitoring the waiting time $W_t$.

In step S630, the apparatus for batch processing 100 determines whether the waiting time $W_t$ is less than a threshold value. Here, the threshold value may be a predetermined fixed value or a changeable variation value that varies depending on a status. For example, the threshold may be any value located between "0" and the setting value of the batch timer.

In response to determining that the waiting time $W_t$ is less than the threshold value, step S650 may be performed. In step S650, the apparatus for batch processing 100 increases the setting value of the batch size or activates the batch processing function. This is because a short waiting time $W_t$ means that more transactions than the set size of the batch size are incoming quickly.

In contrast to the above, in response to determining that the waiting time $W_t$ is greater than or equal to the threshold value, step S670 may be performed. In step S670, the apparatus for batch processing 100 deactivates the batch processing function or decreases the setting value of the batch size. This is because a long waiting time $W_t$ means that the number of incoming transactions is not large.

The batch size adjusting method according to some embodiments of the present invention has been described with reference to FIGS. 13 to 16. For ease of understanding, the method for adjusting the batch size according to the first to fourth embodiments has been described individually. However, naturally, the setting value of the batch size may be adjusted according to a combination of the first to fourth embodiments described above. Hereinafter, other embodiments for adjusting the setting value of the batch size will be further described.

In the fifth embodiment, in response to determining that a load (e.g. a CPU utilization) of the apparatus for batch processing 100 is less than a threshold value, the apparatus for batch processing 100 may deactivate the batch processing function or decrease the setting value of the batch size. On the contrary, in response to determining that the load is greater than or equal to the threshold value, the apparatus for batch processing 100 may increase the setting value of the batch size.

In a sixth embodiment, in response to determining that a load (e.g. an average CPU utilization of a blockchain node) of the blockchain network 300 is less than a threshold value, the blockchain network 300 may deactivate the batch processing function or decrease the setting value of the batch size. On the contrary, in response to determining that the load is greater than or equal to the threshold value, the apparatus for batch processing 100 may increase the setting value of the batch size.

In a seventh embodiment, in response to the occurrence of the transaction processing failure event, the apparatus for batch processing 100 may deactivate the batch processing function or decrease the setting value of the batch size. This is to minimize the risk of repeated failures of the batch transaction. The transaction processing failure event may include both a failure event for an individual transaction and a failure event for a batch transaction, and the transaction processing failure event may be caused by various causes such as network failure, transaction verification failure, consensus failure, or the like.

In addition, in response to satisfying a condition indicating that the network state is unstable, such as a network delay with the blockchain network 300 being greater than or equal to a threshold, the apparatus for batch processing 100 may deactivate a batch generation function or decrease the setting value of the batch size. This may be understood to prevent the risk of failure of a batch transaction in advance. Naturally, when the network condition is stabilized again, the apparatus for batch processing 100 may reactivate the batch generation function or increase the setting value of the batch size.

In addition, the apparatus for batch processing 100 may calculate a failure probability that the processing of the transaction fails based on various monitoring indicators (e.g. a load of the apparatus for batch processing, network conditions, network delays, the number of failed transactions, the number of incoming or outgoing transactions per unit time, etc.), and in response to determining that the calculated probability of failure is greater than or equal to a threshold, may deactivate the batch generation function or decrease the setting value of the batch size.

Some embodiments of the present invention and effects in accordance with embodiments have been mentioned with reference to FIGS. 1 to 16. The benefits of the present invention are not limited to the benefits mentioned above, and other benefits not mentioned may be clearly understood by those skilled in the art from the description below.

The concept of the present invention described with reference to FIGS. 1 to 16 may be implemented as computer readable codes on a computer readable medium. The computer-readable recording medium may be, for example, a removable recording medium (CD, DVD, Blu-ray disc, USB storage apparatus, removable hard disk) or a fixed recording medium (ROM, RAM, computer equipped hard disk). The computer program recorded on the computer-readable recording medium may be transmitted to other computing apparatus a network such as the Internet and installed in the other computing apparatus, thereby being used in the other computing apparatus.

In the above description, it is described that all components constituting the embodiments of the present invention are combined or operated in one, but the present invention is not necessarily limited to the embodiments. In other words, within the scope of the present invention, all of the components may be selectively operated in combination with one or more.

Although the operations are shown in a particular order in the drawings, it should not be understood that the operations must be performed in the specific order or sequential order shown or that all the illustrated operations must be executed to achieve the desired results. In certain circumstances, multitasking and parallel processing may be advantageous. Moreover, the separation of the various configurations in the embodiments described above should not be understood as such separation being necessary. It should be understood that the described program components and systems may generally be integrated together into a single software product or packaged into multiple software products.

The methods according to the embodiment of the present invention described with reference to the accompanying drawings may be performed by execution of a computer program that is achieved by the computer-readable code. The computer program may be transmitted from the first computing device to the second computing device through a network such as Internet and may be installed on the second computing device, and thus, the computer program may be used in the second computing device. The first computing device and the second computing device includes all of a fixed computing device such as a server device and a desktop PC, and a mobile computing device such as a laptop computer, a smart phone and a tablet IPC.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for batch processing for a plurality of individual transactions, comprising:
    a memory for storing one or more instructions;
    a communication interface for communicating with a blockchain network; and
    a processor, the processor executing the one or more instructions for batch processing function to generate a batch transaction by aggregating at least some of the plurality of individual transactions depending on a setting value of a batch size and to process the batch transaction via the blockchain network,
    wherein the processor classifies the plurality of individual transactions according to predetermined classification criteria, inserts the plurality of individual transactions into a batch queue corresponding to a classification result, and in response to determining that the number of a first plurality of individual transactions inserted into a first batch queue satisfies the setting value of the batch size, aggregates the first plurality of individual transactions to generate the batch transaction, wherein the classification criteria comprise an identifier of a smart contract associated with an individual transaction.

2. The apparatus of claim 1, wherein the classification criteria further comprise at least one of a channel identifier associated with an individual transaction, and a type of an individual transaction.

3. The apparatus of claim 1, wherein in response to determining that the number of individual transactions incoming to the apparatus for batch processing during a unit time is less than a threshold value, the processor decreases the setting value of the batch size or deactivates the batch processing function.

4. The apparatus of claim 1, wherein in response to determining that the number of individual transactions incoming to the apparatus for batch processing during a unit time is greater than or equal to a threshold value, the processor increases the setting value of the batch size or activates the batch processing function.

5. The apparatus of claim 1, wherein in response to determining that the number of transactions outgoing from the apparatus for batch processing during a unit time is greater than or equal to a threshold value, the processor increases the setting value of the batch size or activates the batch processing function.

6. The apparatus of claim 1, wherein in response to determining that the number of transactions outgoing from the apparatus for batch processing during a unit time is less than a threshold value, the processor decreases the setting value of the batch size or deactivates the batch processing function.

7. The apparatus of claim 1, wherein in response to determining that a processing time of a transaction is less than a threshold value, the processor decreases the setting value of the batch size or deactivates the batch processing function.

8. The apparatus of claim 1, wherein in response to determining that a processing time of a transaction is greater than or equal to a threshold value, the processor increases the setting value of the batch size or activates the batch processing function.

9. The apparatus of claim 1, wherein in response to determining that a load on the apparatus for batch processing is less than a threshold value, the processor decreases the setting value of the batch size or deactivates the batch processing function.

10. The apparatus of claim 1, wherein in response to determining that a load on the apparatus for batch processing is greater than or equal to a threshold value, the processor increases the setting value of the batch size or activates the batch processing function.

11. The apparatus of claim 1, wherein in response to determining that a load on the blockchain network is less than a threshold value, the processor decreases the setting value of the batch size or deactivates the batch processing function.

12. The apparatus of claim 1, wherein in response to determining that a load on the blockchain network is greater than or equal to a threshold value, the processor increases the setting value of the batch size or activates the batch processing function.

13. The apparatus of claim 1, wherein when a transaction processing failure event occurs, the processor decreases the setting value of the batch size or deactivates the batch processing function.

14. The apparatus of claim 1, wherein in response to a preset batch timer expired, the processor generates the batch transaction even if the number of the plurality of individual transactions does not satisfy the setting value of the batch size.

15. The apparatus of claim 14, wherein the processor measures an amount of time the individual transaction has waited until the batch transaction is generated, and in response to determining that the measured waiting time is less than a threshold value, increases the setting value of the batch size or activates the batch processing function.

16. The apparatus of claim 14, wherein the processor measures an amount of time the individual transaction has waited until the batch transaction is generated, and in response to determining that the measured waiting time is greater than or equal to a threshold value, decreases the setting value of the batch size or deactivates the batch processing function.

17. A method for batch processing for a plurality of individual transactions in an apparatus for batch processing, the method comprising:
generating a batch transaction by aggregating at least some of the plurality of individual transactions according to a setting value of a batch size; and
processing the batch transaction via a blockchain network,
wherein generating the batch transaction comprises:
adjusting the setting value of the batch size based on a monitoring result for a transaction processing status; and
generating the batch transaction according to the adjusted setting value,
wherein the generating the batch transaction according to the adjusted setting value comprising classifying the plurality of individual transactions according to predetermined classification criteria, inserting the plurality of individual transactions into a batch queue corresponding to a classification result, and in response to determining that the number of a first plurality of individual transactions inserted into a first batch queue satisfies the setting value of the batch size, aggregating the first plurality of individual transactions to generate the batch transaction, wherein the classification criteria comprise an identifier of a smart contract associated with an individual transaction.

18. A computer program product stored on a computer readable recording medium, and the computer program product causing to:
generate a batch transaction by aggregating at least some of a plurality of individual transactions according to a setting value of a batch size; and
process the batch transaction via a blockchain network,
wherein generating the batch transaction comprises:
adjusting the setting value of the batch size based on a monitoring result for a transaction processing status; and
generating the batch transaction according to the adjusted setting value,
wherein the generating the batch transaction according to the adjusted setting value comprising classifying the plurality of individual transactions according to predetermined classification criteria, inserting the plurality of individual transactions into a batch queue corresponding to a classification result, and in response to determining that the number of a first plurality of individual transactions inserted into a first batch queue satisfies the setting value of the batch size, aggregating the first plurality of individual transactions to generate the batch transaction, wherein the classification criteria comprise an identifier of a smart contract associated with an individual transaction.

\* \* \* \* \*